US010326201B2

(12) United States Patent
Kuriyama et al.

(10) Patent No.: US 10,326,201 B2
(45) Date of Patent: Jun. 18, 2019

(54) ANTENNA APPARATUS AND ANTENNA EXCITATION METHOD

(71) Applicant: MITSUBISHI ELECTRIC CORPORATION, Tokyo (JP)

(72) Inventors: Tasuku Kuriyama, Tokyo (JP); Satoshi Yamaguchi, Tokyo (JP); Masataka Otsuka, Tokyo (JP); Toru Fukasawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/078,595

(22) PCT Filed: Jan. 27, 2017

(86) PCT No.: PCT/JP2017/002961
§ 371 (c)(1),
(2) Date: Aug. 21, 2018

(87) PCT Pub. No.: WO2017/150031
PCT Pub. Date: Sep. 8, 2017

(65) Prior Publication Data

US 2019/0051984 A1 Feb. 14, 2019

(30) Foreign Application Priority Data

Mar. 2, 2016 (WO) .................. PCT/JP2016/056425

(51) Int. Cl.
*H04B 7/02* (2018.01)
*H04W 24/00* (2009.01)
(Continued)

(52) U.S. Cl.
CPC ................ *H01Q 3/34* (2013.01); *H01Q 3/26* (2013.01); *H01Q 3/28* (2013.01)

(58) Field of Classification Search
CPC ... H04B 1/04; H04B 1/38; H04B 7/04; H04B 7/0617; H04B 7/0695; H01Q 3/26;
(Continued)

(56) References Cited

U.S. PATENT DOCUMENTS 3,569,976 A * 3/1971 Korvin .................. H01Q 3/245
343/779
4,893,129 A * 1/1990 Kodera ............. H01Q 21/0075
343/700 MS
(Continued)

FOREIGN PATENT DOCUMENTS

| | | |
|---|---|---|
| JP | 3-16717 U | 2/1991 |
| JP | 2015-65565 A | 4/2015 |

OTHER PUBLICATIONS

Daly et al., "Directional Modulation Technique for Phased Arrays", IEEE Transactions on Antennas and Propagation, vol. 57, No. 9, Sep. 2009, pp. 2633-2640.

*Primary Examiner* — Quochien B Vuong
(74) *Attorney, Agent, or Firm* — Birch, Stewart, Kolasch & Birch, LLP

(57) ABSTRACT

There are provided a communication excitation distribution calculating unit (11) that calculates an excitation distribution W1(*t*) of a communication beam using an excitation phase distribution S that directs a main lobe of the communication beam in a communication direction; an interference excitation distribution calculating unit (14) that calculates an excitation distribution W2(*t*) of an interference beam using an excitation phase distribution D that forms a null of an antenna pattern in the communication direction; and an excitation distribution combining unit (20) that combines the excitation distribution W1(*t*) of the communication beam and the excitation distribution W2(*t*) of the interference beam. An amplitude/phase controlling unit (30) controls amplitudes and phases of carrier signals to be provided to
(Continued)

element antennas (3-1) to (3-K), in accordance with the combined excitation distribution obtained by the excitation distribution combining unit (20).

16 Claims, 15 Drawing Sheets

(51) Int. Cl.
*H01Q 3/34* (2006.01)
*H01Q 3/26* (2006.01)
*H01Q 3/28* (2006.01)

(58) Field of Classification Search
CPC ........ H01Q 3/2605; H01Q 3/267; H01Q 3/28; H01Q 3/30; H01Q 3/34; H01Q 21/06; H04W 72/082
USPC ....... 455/101, 115.1, 115.2, 423, 424, 562.1; 343/729, 737, 758, 776, 893
See application file for complete search history.

(56) References Cited

U.S. PATENT DOCUMENTS 7,855,690 B2 * 12/2010 Hook ....................... H01Q 1/38 343/754
8,509,335 B2 * 8/2013 Nakada ..................... G01S 7/03 375/267
8,611,959 B2 * 12/2013 Banu .................... H04B 7/0682 455/562.1
2015/0318611 A1 * 11/2015 Rawlins ................... H01Q 3/26 342/368

* cited by examiner

ANTENNA APPARATUS AND ANTENNA EXCITATION METHOD

TECHNICAL FIELD

This disclosure relates to antenna apparatuses and antenna excitation methods for controlling the amplitude and phase of carrier signals to be provided to a plurality of element antennas in an array antenna.

BACKGROUND ART

An antenna apparatus equipped with a phased array antenna can form a directional beam by controlling the amplitude and phase of carrier signals to be provided to a plurality of element antennas that form the phased array antenna.

In communication using a directional beam, a communication signal which is a signal to be communicated is transmitted not only in a main lobe direction of the directional beam but also in sidelobe directions. Hence, there is a case in which even a receiving station present in a direction different than a communication direction can receive a communication signal and demodulate the communication signal.

The following Non-Patent Literature 1 discloses an antenna apparatus that limits a communicable area by mounting an array antenna that transmits signals only to an area near a communication direction (hereinafter, referred to as "directional modulation array antenna").

The antenna apparatus generates a baseband modulated signal, a signal to be communicated, by performing a quadrature phase shift keying (QPSK) modulation process on a transmission bit sequence, calculates an excitation distribution that associates the amplitude and phase of each constellation point of the baseband modulated signal with electric field amplitude and phase in a communication direction, and provides carrier signals to be provided to a plurality of element antennas forming the directional modulation array antenna with the calculated excitation distribution in a time division manner.

The following Patent Literature 1 discloses an antenna apparatus that achieves narrower coverage of a directional modulation array antenna.

The antenna apparatus limits a communicable area by obtaining a non-uniform excitation distribution for the directional modulation array antenna. For example, in a case in which the directional modulation array antenna is a linear array antenna, of carrier signals to be provided to a plurality of element antennas forming the array antenna, carrier signals to be provided to element antennas disposed at the edges are increased in excitation amplitude over a carrier signal to be provided to an element antenna disposed at the center, by which the communicable area is limited.

CITATION LIST

Patent Literatures

Patent Literature 1: JP 2015-65565 A

Non-Patent Literatures

Non-Patent Literature 1: M. P. Daly, "Directional Modulation Technique for Phased arrays", IEEE Trans. Antennas Propagat., vol. 57, pp. 2633-2640, 2009.

SUMMARY OF INVENTION

Technical Problem

Since conventional antenna apparatuses are formed in the above-described manner, it is necessary to calculate an excitation distribution provided in a time division manner. Further, it is necessary to calculate an excitation distribution in which the excitation amplitudes of carrier signals to be provided to element antennas disposed at the edges are larger than that of a carrier signal to be provided to an element antenna disposed at the center. These excitation distributions can be obtained by solving an evaluation function obtained based on the bit error rate for each direction, etc., using an optimization technique such as a genetic algorithm (GA). However, when the optimization technique is used, the amount of computation is enormous and thus there is a problem that it may take a long time to obtain an excitation distribution.

An aspect of embodiments of this disclosure relates to solving the problem described above, and an object of the embodiments is to obtain an antenna apparatus and an antenna excitation method that are capable of reducing the amount of computation for an excitation distribution for an array antenna that is used to implement secure communication with a limited communicable area.

Solution to Problem

An antenna apparatus according to the present disclosure is provided with an array antenna including a plurality of element antennas for radiating carrier signals; a communication signal generating unit for generating a communication signal that is a signal to be communicated; an interference signal generating unit for generating an interference signal serving as a disturbing wave for the communication signal; a communication excitation distribution calculating unit for calculating an excitation distribution of a communication beam by using an excitation phase distribution that directs a main lobe of the communication beam toward a communication direction, the communication beam being a radio wave that transmits the communication signal; an interference excitation distribution calculating unit for calculating an excitation distribution of an interference beam by using an excitation phase distribution that forms a null of an antenna pattern in the communication direction, the interference beam being a radio wave that transmits the interference signal; an excitation distribution combining unit for combining the excitation distribution of the communication beam calculated by the communication excitation distribution calculating unit and the excitation distribution of the interference beam calculated by the interference excitation distribution calculating unit; and an amplitude/phase controlling unit for controlling amplitudes and phases of carrier signals to be provided to the plurality of element antennas in accordance with the combined excitation distribution obtained by the excitation distribution combining unit.

Advantageous Effects of Invention

According to an aspect of embodiments of the present disclosure, an antenna apparatus is configured such that it is equipped with the communication excitation distribution calculating unit that calculates an excitation distribution of a communication beam by using an excitation phase distribution that directs a main lobe of the communication beam toward a communication direction, and the interference excitation distribution calculating unit that calculates an excitation distribution of an interference beam by using an excitation phase distribution that forms a null of an antenna pattern in the communication direction, and that the excitation distribution combining unit combines the excitation distribution of the communication beam calculated by the communication excitation distribution calculating unit and the excitation distribution of the interference beam calculated by the interference excitation distribution calculating unit. Hence, there is an advantageous effect of being able to reduce the amount of computation for an excitation distribution for the array antenna that is used to implement secure communication with a limited communicable area.

BRIEF DESCRIPTION OF DRAWINGS

FIG. 3 is a hardware configuration diagram of a computer for a case in which the signal processing unit 10 is implemented by software, firmware, or the like.

DESCRIPTION OF EMBODIMENTS

Hereinafter, to describe this application in more detail, embodiments in accordance with the disclosure will be described with reference to the accompanying drawings.

Embodiment 1

Figure 1:
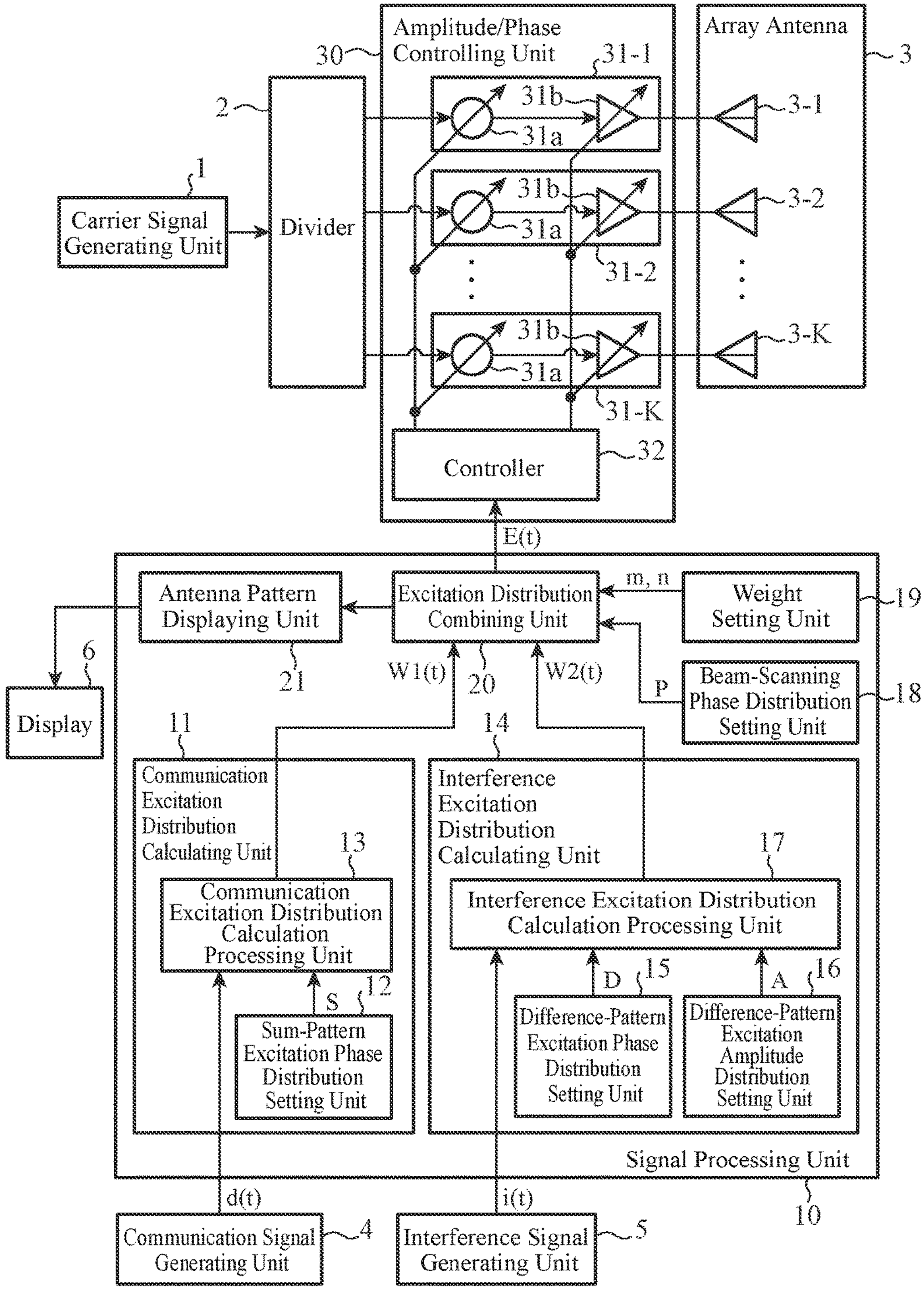
FIG. 1 is a configuration diagram showing an antenna apparatus in accordance with Embodiment 1 of the disclosure.
Figure 2:
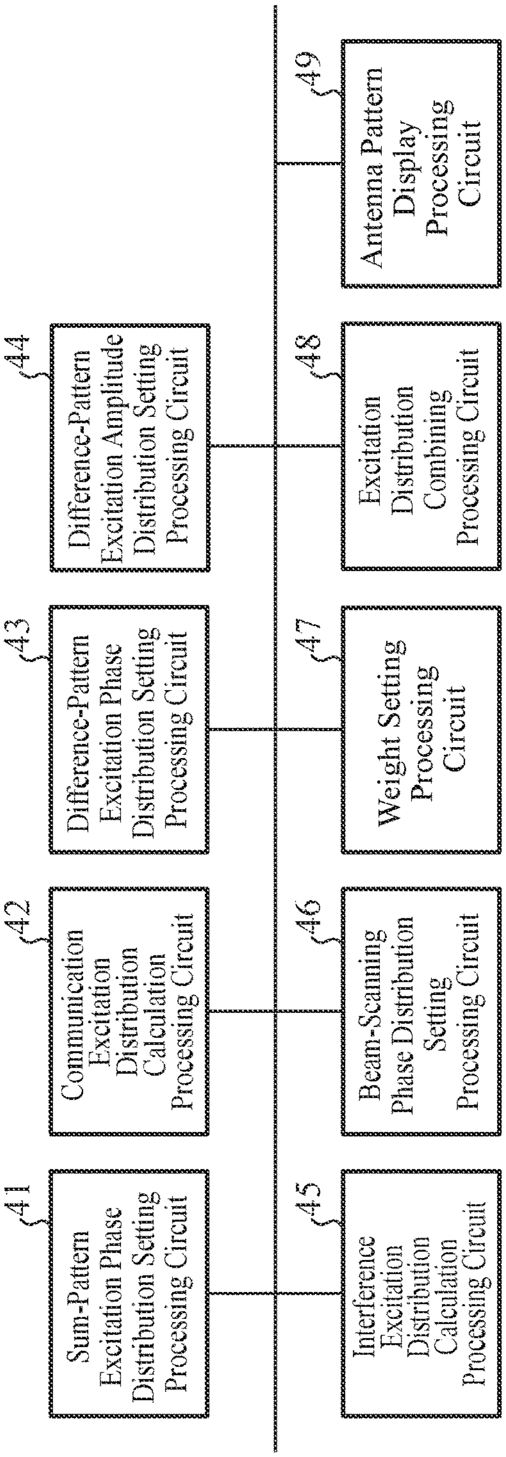
FIG. 2 is a hardware configuration diagram of a signal processing unit 10 of the antenna apparatus in accordance with Embodiment 1 of the disclosure.

FIG. 1 is a configuration diagram showing an antenna apparatus in accordance with Embodiment 1 of the disclosure, and FIG. 2 is a hardware configuration diagram of a signal processing unit 10 of the antenna apparatus in accordance with Embodiment 1 of the disclosure.

In FIGS. 1 and 2, a carrier signal generating unit 1 is, for example, a signal oscillator for generating a radio frequency carrier signal.

A divider 2 divides the carrier signal generated by the carrier signal generating unit 1 into K carrier signals (K is an integer equal to or more than two) and outputs the K carrier signals to an amplitude/phase controlling unit 30.

An array antenna 3 includes K element antennas 3-1 to 3-K, and the element antennas 3-1 to 3-K radiate carrier signals whose amplitudes and phases are adjusted by amplitude/phase adjusters 31-1 to 31-K in the amplitude/phase controlling unit 30 into space.

A communication signal generating unit 4 is implemented by, for example, a semiconductor integrated circuit having a central processing unit (CPU) mounted thereon, a single-chip microcomputer, or the like.

The communication signal generating unit 4 performs, for example, a process of generating a communication signal d(t) which is a signal to be communicated, by performing a baseband modulation process such as QPSK on a transmission bit sequence which is provided from an external source.

Although here an example in which the modulation scheme for the transmission bit sequence is QPSK is shown, the modulation scheme is not limited to QPSK and, for example, a modulation scheme such as binary phase shift keying (BPSK), 16 quadrature amplitude modulation (QAM), or 64QAM may be used.

An interference signal generating unit 5 is implemented by, for example, a semiconductor integrated circuit having a CPU mounted thereon, a single-chip microcomputer, or the like.

The interference signal generating unit 5 performs a process of generating an interference signal i(t) which serves as a disturbing wave for the communication signal d(t) generated by the communication signal generating unit 4.

Note that the modulation scheme used when the interference signal generating unit 5 generates the interference signal i(t) may be the same as or different from the modulation scheme used when the communication signal generating unit 4 generates the communication signal d(t). Alternatively, the interference signal i(t) generated by the interference signal generating unit 5 may be a random-phase signal without depending on the modulation scheme.

The signal processing unit 10 includes a communication excitation distribution calculating unit 11, an interference excitation distribution calculating unit 14, a beam-scanning phase distribution setting unit 18, a weight setting unit 19, an excitation distribution combining unit 20, and an antenna pattern displaying unit 21.

The signal processing unit 10 performs a process of calculating an excitation distribution for the array antenna 3, i.e., an excitation distribution for controlling the amplitudes and phases of carrier signals.

The communication excitation distribution calculating unit 11 in the signal processing unit 10 includes a sum-pattern excitation phase distribution setting unit 12 and a communication excitation distribution calculation processing unit 13.

The sum-pattern excitation phase distribution setting unit 12 is implemented by, for example, a sum-pattern excitation phase distribution setting processing circuit 41 shown in FIG. 2.

The sum-pattern excitation phase distribution setting unit 12 performs a process of setting a sum-pattern excitation phase distribution S for the array antenna 3 as an excitation phase distribution that directs a main lobe of a communication beam which is a radio wave that transmits the communication signal d(t) toward a communication direction.

The communication excitation distribution calculation processing unit 13 is implemented by, for example, a communication excitation distribution calculation processing circuit 42 shown in FIG. 2.

The communication excitation distribution calculation processing unit 13 performs a process of calculating an excitation distribution W1(*t*) of the communication beam, using the excitation phase distribution S set by the sum-pattern excitation phase distribution setting unit 12.

The interference excitation distribution calculating unit 14 includes a difference-pattern excitation phase distribution setting unit 15, a difference-pattern excitation amplitude distribution setting unit 16, and an interference excitation distribution calculation processing unit 17.

The difference-pattern excitation phase distribution setting unit 15 is implemented by, for example, a difference-pattern excitation phase distribution setting processing circuit 43 shown in FIG. 2.

The difference-pattern excitation phase distribution setting unit 15 performs a process of setting a difference-pattern excitation phase distribution D for the array antenna 3 as an excitation phase distribution that forms a null in an antenna pattern toward the communication direction.

The difference-pattern excitation amplitude distribution setting unit 16 is implemented by, for example, a difference-pattern excitation amplitude distribution setting processing circuit 44 shown in FIG. 2.

The difference-pattern excitation amplitude distribution setting unit 16 performs a process of setting an excitation amplitude distribution A in which the gain of the interference beam which is a radio wave that transmits the interference signal i(t) is increased in the direction corresponding to a sidelobe direction of the communication beam.

The interference excitation distribution calculation processing unit 17 is implemented by, for example, an interference excitation distribution calculation processing circuit 45 shown in FIG. 2.

The interference excitation distribution calculation processing unit 17 performs a process of calculating an excitation distribution W2(*t*) of the interference beam by using the excitation phase distribution D set by the difference-pattern excitation phase distribution setting unit 15 and the excitation amplitude distribution A set by the difference-pattern excitation amplitude distribution setting unit 16.

The beam-scanning phase distribution setting unit 18 is implemented by, for example, a beam-scanning phase distribution setting processing circuit 46 shown in FIG. 2.

The beam-scanning phase distribution setting unit 18 performs a process of setting a beam-scanning phase distribution P that determines the communication direction.

The weight setting unit 19 is implemented by, for example, a weight setting processing circuit 47 shown in FIG. 2.

The weight setting unit 19 performs a process of setting a weight m for the excitation distribution W1(*t*) of the communication beam calculated by the communication excitation distribution calculating unit 11 and a weight n for the excitation distribution W2(*t*) of the interference beam calculated by the interference excitation distribution calculating unit 14.

The excitation distribution combining unit 20 is implemented by, for example, an excitation distribution combining processing circuit 48 shown in FIG. 2.

The excitation distribution combining unit 20 performs a process of combining the excitation distribution W1(*t*) of the communication beam calculated by the communication excitation distribution calculating unit and the excitation distribution W2(*t*) of the interference beam calculated by the interference excitation distribution calculating unit 14, in accordance with the weights m and n set by the weight setting unit 19.

In addition, the excitation distribution combining unit 20 performs a process of calculating a combined excitation distribution E(t) (combined excitation distribution) by multiplying the excitation distribution which is obtained by combining the excitation distribution W1(*t*) and the excitation distribution W2(*t*), by the beam-scanning phase distribution P set by the beam-scanning phase distribution setting unit 18, and outputting the combined excitation distribution E(t).

The antenna pattern displaying unit 21 is implemented by, for example, an antenna pattern display processing circuit 49 shown in FIG. 2.

The antenna pattern displaying unit 21 performs a process of computing an antenna pattern from the combined excitation distribution E(t) outputted from the excitation distribution combining unit 20, and outputting the antenna pattern to a display 6.

The display 6 includes, for example, a liquid crystal display, etc., and displays the antenna pattern outputted from the antenna pattern displaying unit 21.

The amplitude/phase controlling unit 30 includes the amplitude/phase adjusters 31-1 to 31-K and a controller 32, and controls the amplitudes and phases of carrier signals to be provided to the element antennas 3-1 to 3-K, in accordance with the combined excitation distribution E(t) outputted from the excitation distribution combining unit 20.

The amplitude/phase adjusters 31-1 to 31-K each include a phase controlling device 31*a* and an amplitude controlling device 31*b*.

The phase controlling device 31*a* includes, for example, a phase shifter and adjusts the phase of a carrier signal divide by the divider 2, in accordance with the amount of phase adjustment indicated by a control signal outputted from the controller 32.

The amplitude controlling device 31*b* includes, for example, a variable gain amplifier and adjusts the amplitude of the carrier signal whose phase has been adjusted by the phase controlling device 31*a*, in accordance with the amount of amplitude adjustment indicated by a control signal outputted from the controller 32.

The controller 32 controls the amounts of adjustment of amplitude and phase for the amplitude/phase adjusters 31-1 to 31-K, in accordance with the combined excitation distribution E(t) outputted from the excitation distribution combining unit 20.

In the example illustrated in FIG. 1, it is assumed that each of the communication excitation distribution calculating unit 11, the interference excitation distribution calculating unit 14, the beam-scanning phase distribution setting unit 18, the weight setting unit 19, the excitation distribution combining unit 20, and the antenna pattern displaying unit 21 which are components of the signal processing unit 10 is implemented by dedicated hardware such as that shown in FIG. 2.

Namely, it is assumed that the signal processing unit 10 is implemented by the sum-pattern excitation phase distribution setting processing circuit 41, the communication excitation distribution calculation processing circuit 42, the difference-pattern excitation phase distribution setting processing circuit 43, the difference-pattern excitation amplitude distribution setting processing circuit 44, the interference excitation distribution calculation processing circuit 45, the beam-scanning phase distribution setting processing circuit 46, the weight setting processing circuit 47, the excitation distribution combining processing circuit 48, and the antenna pattern display processing circuit 49.

Each of the sum-pattern excitation phase distribution setting processing circuit 41, the communication excitation distribution calculation processing circuit 42, the difference-pattern excitation phase distribution setting processing circuit 43, the difference-pattern excitation amplitude distribution setting processing circuit 44, the interference excitation distribution calculation processing circuit 45, the beam-scanning phase distribution setting processing circuit 46, the weight setting processing circuit 47, the excitation distribution combining processing circuit 48, and the antenna pattern display processing circuit 49 may be, for example, a single circuit, a combined circuit, a programmed processor, a parallel programmed processor, an application specific integrated circuit (ASIC), a field-programmable gate array (FPGA), or a combination thereof.

Note, however, that the components of the signal processing unit 10 in the antenna apparatus are not limited to those implemented by dedicated hardware, and the signal processing unit 10 may be implemented by software, firmware, or a combination of software and firmware.

The software or firmware is stored as a program in a memory of a computer. The computer refers to hardware that executes the program and may be, for example, a central processing unit (CPU), a processing device, a computing device, a microprocessor, a microcomputer, a processor, a digital signal processor (DSP), etc.

Figure 3:
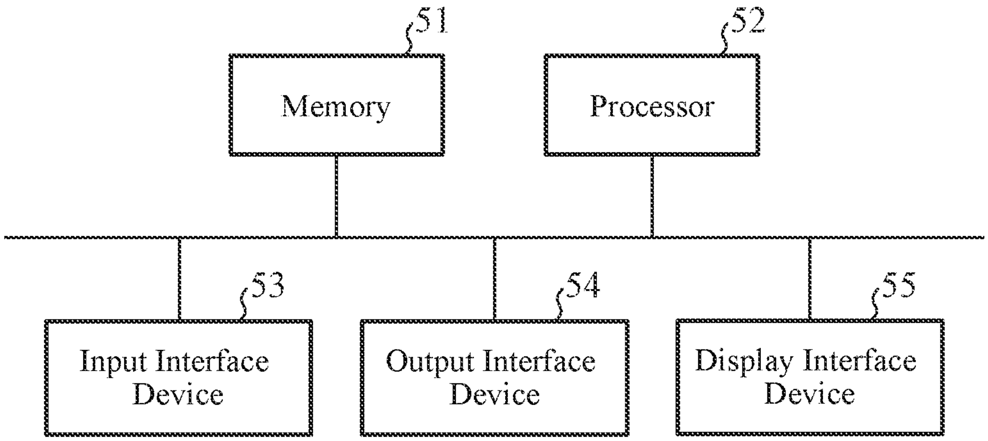

FIG. 3 is a hardware configuration diagram of a computer for a case in which the signal processing unit 10 is implemented by software, firmware, or the like.

In a case in which the signal processing unit 10 is implemented by software, firmware, or the like, a program for causing a computer to perform processing procedures of the communication excitation distribution calculating unit 11, the interference excitation distribution calculating unit 14, the beam-scanning phase distribution setting unit 18, the weight setting unit 19, the excitation distribution combining unit 20, and the antenna pattern displaying unit 21 is stored in a memory 51, and a processor 52 of the computer executes the program stored in the memory 51.

The memory 51 of the computer may be, for example, a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a MiniDisc, a digital versatile disc (DVD), etc.

Note that in FIG. 3 an input interface device 53 is, for example, an interface device having a signal input/output port such as a universal serial bus (USB) port or a serial port.

The input interface device 53 is connected to the communication signal generating unit 4 and the interference signal generating unit 5 and accepts, as input, the communication signal d(t) outputted from the communication signal generating unit 4 and the interference signal i(t) outputted from the interference signal generating unit 5.

An output interface device 54 is, for example, an interface device having a signal input/output port such as a USB port or a serial port.

The output interface device 54 is connected to the amplitude/phase controlling unit 30 and outputs the combined excitation distribution E(t) outputted from the excitation distribution combining unit 20, to the amplitude/phase controlling unit 30.

A display interface device 55 is an interface device for establishing connection with the display 6 and outputs the antenna pattern outputted from the antenna pattern displaying unit 21, to the display 6.

Figure 4:
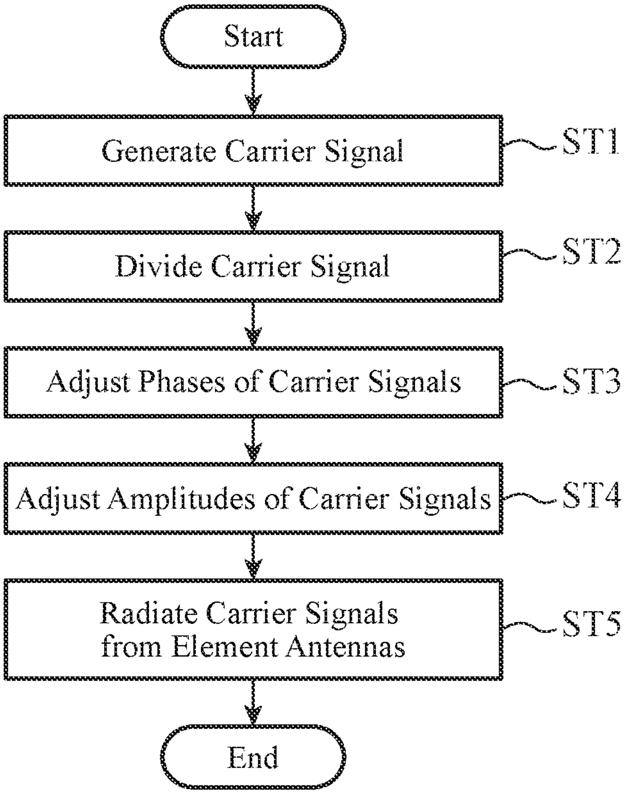
FIG. 4 is a flowchart showing the operation of a carrier signal generating unit 1, a divider 2, an amplitude/phase controlling unit 30, and element antennas 3-1 to 3-K.

FIG. 4 is a flowchart showing the operation of the carrier signal generating unit 1, the divider 2, the amplitude/phase controlling unit 30, and the element antennas 3-1 to 3-K.

Figure 5:
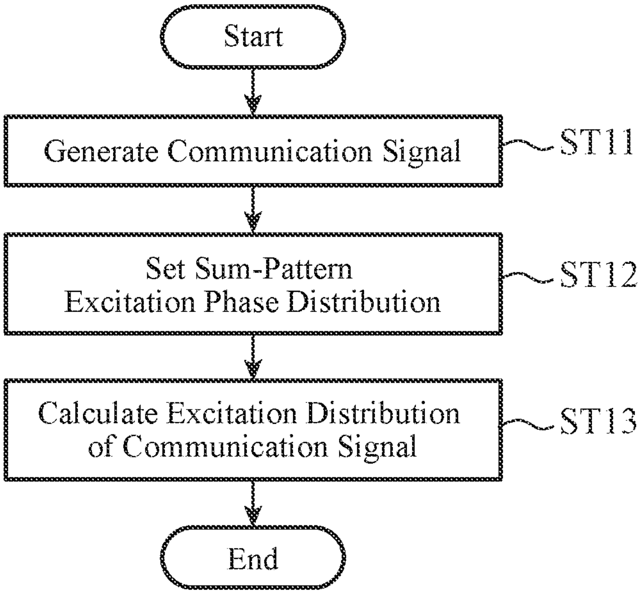
FIG. 5 is a flowchart showing the processing operations of a communication signal generating unit 4 and a communication excitation distribution calculating unit 11.

FIG. 5 is a flowchart showing the processing operations of the communication signal generating unit 4 and the communication excitation distribution calculating unit 11.

Figure 6:
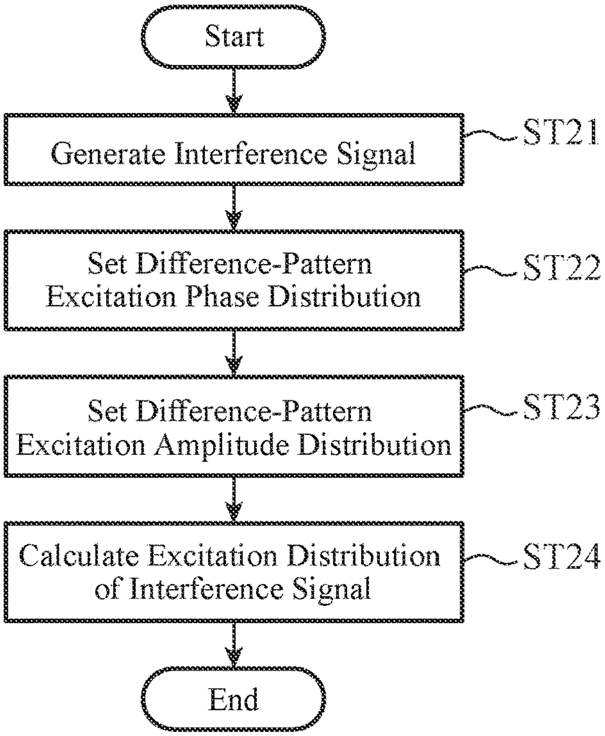
FIG. 6 is a flowchart showing the processing operations of an interference signal generating unit 5 and an interference excitation distribution calculating unit 14.

FIG. 6 is a flowchart showing the processing operations of the interference signal generating unit 5 and the interference excitation distribution calculating unit 14.

Figure 7:
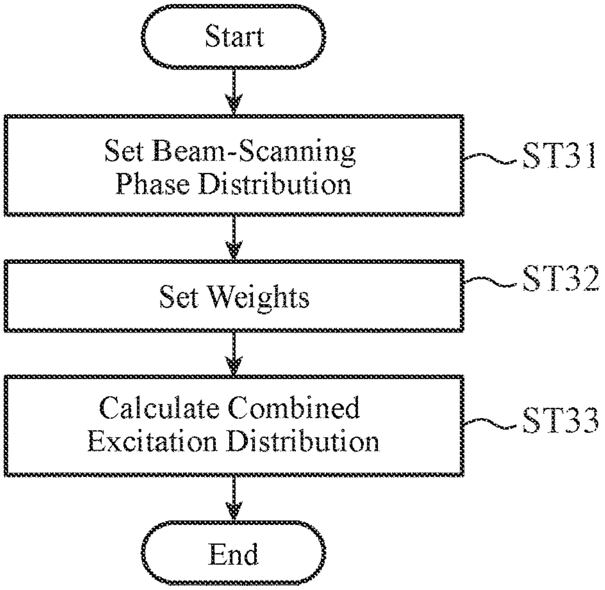
FIG. 7 is a flowchart showing the processing operations of a beam-scanning phase distribution setting unit 18, a weight setting unit 19, and an excitation distribution combining unit 20.

FIG. 7 is a flowchart showing the processing operations of the beam-scanning phase distribution setting unit 18, the weight setting unit 19, and the excitation distribution combining unit 20.

Figure 8:
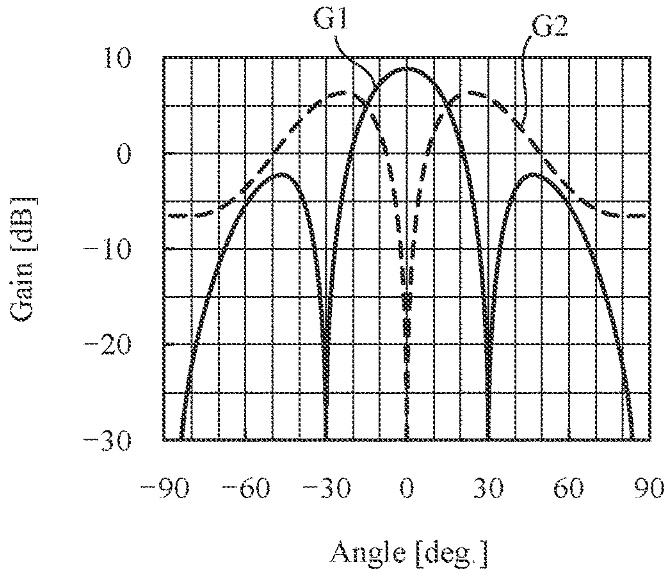
FIG. 8 is an illustrative diagram showing an amplitude characteristic of a communication beam calculated from an excitation distribution W1($t$) of the communication beam, and an amplitude characteristic of an interference beam calculated from an excitation distribution W2($t$) of the interference beam.

FIG. 8 is an illustrative diagram showing an amplitude characteristic of a communication beam calculated from an excitation distribution W1(*t*) of the communication beam, and an amplitude characteristic of an interference beam calculated from an excitation distribution W2(*t*) of the interference beam.

In FIG. 8, G1 indicates the amplitude characteristic of the communication beam and G2 indicates the amplitude characteristic of the interference beam.

Figure 9:
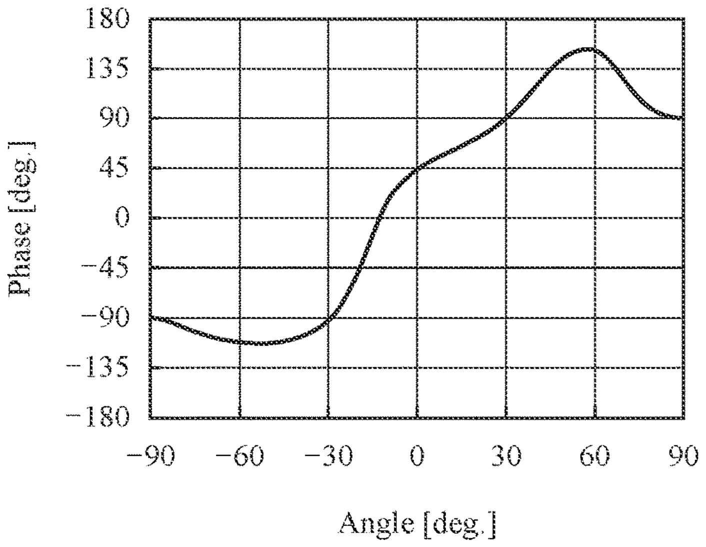
FIG. 9 is an illustrative diagram showing a phase characteristic of an antenna pattern calculated from a combined excitation distribution E(t).

FIG. 9 is an illustrative diagram showing a phase characteristic of an antenna pattern calculated from a combined excitation distribution E(t).

Next, the operations will be described.

The carrier signal generating unit 1 generates, for example, a radio frequency carrier signal and outputs the carrier signal to the divider 2 (step ST1 in FIG. 4).

When the divider 2 receives the carrier signal from the carrier signal generating unit 1, the divider 2 divides the carrier signal into K carrier signals and outputs the K carrier signals to the amplitude/phase controlling unit 30 (step ST2).

The communication signal generating unit 4 generates a communication signal d(t) which is a signal to be communicated, by, for example, performing a baseband modulation process such as QPSK on a transmission bit sequence which is provided from an external source, and outputs the communication signal d(t) to the communication excitation distribution calculating unit 11 in the signal processing unit 10 (step ST11 in FIG. 5).

Here, t represents the time, and when the modulation scheme is QPSK, the constellation points of the communication signal d(t) are exp(jπ/4), exp(j3π/4), exp(−j3π/4), and exp(−jπ/4).

The sum-pattern excitation phase distribution setting unit 12 in the communication excitation distribution calculating unit 11 sets a sum-pattern excitation phase distribution S for the array antenna 3 as an excitation phase distribution that directs a main lobe of a communication beam toward a communication direction (step ST12).

The sum-pattern excitation phase distribution S is, though detailed description thereof is omitted as the sum-pattern excitation phase distribution S is a publicly known excitation phase distribution, represented by a matrix with K rows and one column, and each element of the matrix is a complex number. Since the sum-pattern excitation phase is 0 degrees, as shown in Equation (1) below, the excitation phase distribution S is a matrix having exp(j0) as elements:

$$S=\begin{bmatrix} S_1 \\ S_2 \\ \vdots \\ S_K \end{bmatrix}=\begin{bmatrix} \exp(j0) \\ \exp(j0) \\ \vdots \\ \exp(j0) \end{bmatrix}=\begin{bmatrix} 1 \\ 1 \\ \vdots \\ 1 \end{bmatrix} \tag{1}$$

It is known that by calculating an excitation distribution of the communication beam using the sum-pattern excitation phase distribution S, an amplitude characteristic like G1 in FIG. 8 can be obtained as an amplitude characteristic of the communication beam.

In the amplitude characteristic G1 of the communication beam shown in FIG. 8, since a main lobe of the communication beam has its peak at 0 degrees, a 0-degree direction is a communication direction.

When the sum-pattern excitation phase distribution setting unit 12 sets the sum-pattern excitation phase distribution S, as shown in Equation (2) below, the communication excitation distribution calculation processing unit 13 calculates an excitation distribution W1(*t*) of the communication beam by multiplying the communication signal d(t) outputted from the communication signal generating unit 4 by the excitation phase distribution S (step ST13):

$$W1(t)=d(t)\cdot S \tag{2}$$

The interference signal generating unit 5 generates an interference signal i(t) which serves as a disturbing wave for the communication signal d(t) generated by the communication signal generating unit 4, and outputs the interference signal i(t) to the interference excitation distribution calculating unit 14 in the signal processing unit 10 (step ST21 in FIG. 6). For example, as the interference signal i(t), a random-phase signal is generated.

The difference-pattern excitation phase distribution setting unit 15 in the interference excitation distribution calculating unit 14 sets a difference-pattern excitation phase distribution D for the array antenna 3 as an excitation phase distribution that forms a null of an antenna pattern in the communication direction in an interference beam which is a radio wave that transmits the interference signal i(t) (step ST22).

The difference-pattern excitation phase distribution D is, though detailed description thereof is omitted as the difference-pattern excitation phase distribution D is a publicly known excitation phase distribution, represented by a matrix with K rows and one column.

For example, if the elements of the first row to (K/2)nd row of the matrix are exp(jπ) and the elements of the ((K/2)+1)st row to Kth row are exp(j0), then the difference-pattern excitation phase distribution D is represented as shown in Equation (3) below:

$$D=\begin{bmatrix} D_1 \\ \vdots \\ D_{K/2} \\ D_{K/2+1} \\ \vdots \\ D_K \end{bmatrix}=\begin{bmatrix} \exp(j\pi) \\ \vdots \\ \exp(j\pi) \\ \exp(j0) \\ \vdots \\ \exp(j0) \end{bmatrix}=\begin{bmatrix} -1 \\ \vdots \\ -1 \\ 1 \\ \vdots \\ 1 \end{bmatrix} \tag{3}$$

It is known that by calculating an excitation distribution of the interference beam using the difference-pattern excitation phase distribution D, an amplitude characteristic like G2 in FIG. 8 can be obtained as an amplitude characteristic of the interference beam.

In the amplitude characteristic G2 of the interference beam shown in FIG. 8, a null of an antenna pattern is formed in a 0-degree direction.

In Embodiment 1, in view of the fact that the amount of computation is smaller for a process of combining excitation distributions of two beams having an orthogonal relationship than for a process of combining two beams having no orthogonal relationship, a communication beam and an interference beam that have an orthogonal relationship are generated. Hence, it is shown that the sum-pattern excitation phase distribution setting unit 12 sets a sum-pattern excitation phase distribution S and the difference-pattern excitation phase distribution setting unit 15 sets a difference-pattern excitation phase distribution D.

Note, however, that this is merely an example, and a communication beam and an interference beam that have an orthogonal relationship may be generated by setting excitation phase distributions other than sum-pattern and difference-pattern excitation phase distributions.

In addition, excitation phase distributions by which a communication beam and an interference beam that have no orthogonal relationship are generated may be set, though it is assumed that the amount of computation increases more or less. Even in a case of performing a process of combining excitation distributions of a communication beam and an interference beam that have no orthogonal relationship, the amount of computation is significantly reduced over a case of calculating an excitation distribution using an optimization technique.

The difference-pattern excitation amplitude distribution setting unit 16 sets a difference-pattern excitation amplitude distribution A in which the gain of the interference beam is increased in a direction corresponding to a sidelobe direction of the communication beam, to make it difficult to demodulate the communication signal d(t) in the sidelobe direction of the communication beam (step ST23 in FIG. 6).

As shown in FIG. 8, when the gains of the interference beam in the sidelobe directions of the communication beam are higher than the sidelobe gains of the communication beam, the interference signal i(t) is larger than the communication signal d(t). In this case, since the communication signal d(t) is buried in the interference signal i(t), it becomes difficult to demodulate the communication signal d(t) in the sidelobe directions of the communication beam.

Hence, in order to make the relationship between the amplitude characteristic of the communication beam and the amplitude characteristic of the interference beam like the relationship between the amplitude characteristics G1 and G2 shown in FIG. 8, the difference-pattern excitation amplitude distribution setting unit 16 sets a difference-pattern excitation amplitude distribution A in which gains of the interference beam are increased in the sidelobe directions of the communication beam.

The difference-pattern excitation amplitude distribution A is represented by a matrix with K rows and one column, and for example, each element of the matrix is a positive integer. The difference-pattern excitation amplitude distribution A can be obtained from, for example, Taylor distribution, etc.

The Taylor distribution is a distribution in which the sidelobe level decreases as it gets further away from the main beam, and thus, a distribution that is obtained by modifying the Taylor distribution in such a manner that the sidelobe level increases as it gets further away from the main beam may be used as the difference-pattern excitation amplitude distribution A.

Namely, although the Taylor distribution is known to be a distribution that decreases the sidelobe level, by using the Taylor distribution for the difference-pattern excitation amplitude distribution A, the sidelobe level can be increased and the gains of the interference beam can be increased in the sidelobe directions of the communication beam.

When the difference-pattern excitation phase distribution setting unit 15 sets the excitation phase distribution D and the difference-pattern excitation amplitude distribution setting unit 16 sets the excitation amplitude distribution A, as shown in Equation (4) below, the interference excitation distribution calculation processing unit 17 calculates an excitation distribution W2($t$) of the interference beam by multiplying the interference signal i(t) outputted from the interference signal generating unit 5 by the excitation phase distribution D and a diagonal matrix of the excitation amplitude distribution A (step ST24 in FIG. 6):

$$W2(t)=i(t)\cdot \mathrm{diag}(A)\cdot D \tag{4}$$

In Eq. (4), diag(A) is the diagonal matrix having A as diagonal elements.

The beam-scanning phase distribution setting unit 18 sets a beam-scanning phase distribution P that determines the communication direction (step ST31 in FIG. 7).

For example, there is a case in which the sum-pattern excitation phase distribution setting unit 12 sets an excitation phase distribution S that directs the main lobe of the communication beam in the 0-degree direction, and the difference-pattern excitation phase distribution setting unit 15 sets an excitation phase distribution D that forms a null of an antenna pattern in the 0-degree direction. In a case in which, when the excitation phase distribution S and the excitation phase distribution D are thus set, for example, the communication direction needs to be directed in a 30-degree direction, a 45-degree direction, etc., the beam-scanning phase distribution setting unit 18 sets a beam-scanning phase distribution P in which the communication direction indicates the 30-degree direction or 45-degree direction, by which the communication direction is changed to the 30-degree direction or 45-degree direction.

In this case, the main lobe of the communication beam is directed in the 30-degree direction or 45-degree direction, and for the interference beam the null of the antenna pattern is formed in the 30-degree direction or 45-degree direction.

The beam-scanning phase distribution P is represented by a matrix with K rows and one column, and each element of the matrix is a complex number. FIG. 8 shows an example of setting a beam-scanning phase distribution P that sets the communication direction to the 0-degree direction.

When the communication direction needs to be switched as appropriate, the beam-scanning phase distribution setting unit 18 needs to be implemented; however, when the communication direction is fixed, e.g., when the communication direction is always a front direction of the array antenna 3, the beam-scanning phase distribution setting unit 18 may not be implemented and the excitation distribution combining unit 20 may store a beam-scanning phase distribution P which is set beforehand.

The weight setting unit 19 sets weights m and n (m and n are positive integers) for the excitation distribution W1($t$) of the communication beam calculated by the communication excitation distribution calculating unit and the excitation distribution W2($t$) of the interference beam calculated by the interference excitation distribution calculating unit 14 (step ST32).

The weights m and n are to set a combining ratio of the excitation distribution W1($t$) of the communication beam and the excitation distribution W2($t$) of the interference beam. For example, when $m<n$, the degree of contribution of the excitation distribution W2($t$) of the interference beam can be increased in a combined excitation distribution E(t) of the excitation distribution W1($t$) and the excitation distribution W2($t$). Namely, the interference signal i(t) which is transmitted by the interference beam is increased, by which a communicable area can be narrowed.

On the other hand, when $m>n$, the degree of contribution of the excitation distribution W2($t$) of the interference beam can be reduced in the combined excitation distribution E(t) of the excitation distribution W1($t$) and the excitation distribution W2($t$). Namely, the interference signal i(t) which is transmitted by the interference beam is reduced, by which the communicable area can be widened.

Note that when the excitation distribution W1($t$) of the communication beam and the excitation distribution W2($t$) of the interference beam are always combined at the same ratio without changing the combining ratio thereof, e.g., when the excitation distribution W1($t$) of the communication beam and the excitation distribution W2($t$) of the interference beam are always combined such that $m=n=1$, the weight setting unit 19 may not be implemented and the excitation distribution combining unit 20 may store weights m and n which are set beforehand.

When the beam-scanning phase distribution setting unit 18 sets the beam-scanning phase distribution P and the weight setting unit 19 sets the weights m and n, the excitation distribution combining unit 20 combines the excitation distribution W1($t$) of the communication beam calculated by the communication excitation distribution calculating unit 11 and the excitation distribution W2($t$) of the interference beam calculated by the interference excitation distribution calculating unit 14, in accordance with the weights m and n.

Then, as shown in equation (5) below, the excitation distribution combining unit 20 calculates a combined excitation distribution E(t) by multiplying the excitation distribution which is obtained by combining the excitation distribution W1($t$) and the excitation distribution W2($t$), by a diagonal matrix of the beam-scanning phase distribution P (step ST33):

$$E(t)=\mathrm{diag}(P)\cdot\{m\cdot W1(t)+n\cdot W2(t)\} \quad (5)$$

The combined excitation distribution E(t) is obtained by combining the communication beam and the interference beam that have an orthogonal relationship, and as can also be seen from Eq. (5), only simple computation is performed in a process of combining the communication beam and the interference beam that have an orthogonal relationship. Namely, only by performing addition and multiplication of the matrix, the communication beam and the interference beam can be combined. Hence, comparing to a case of calculating a combined excitation distribution E(t) using an optimization technique, the amount of computation is about a few percent to a few tenths of a percent.

When the excitation distribution combining unit 20 calculates the combined excitation distribution E(t), the excitation distribution combining unit 20 outputs the combined excitation distribution E(t) as an excitation distribution for the array antenna 3 to the amplitude/phase controlling unit 30.

When the controller 32 in the amplitude/phase controlling unit 30 receives the combined excitation distribution E(t) from the excitation distribution combining unit 20, the controller 32 outputs control signals indicating amounts of adjustment of amplitude and phase for the amplitude/phase adjusters 31-1 to 31-K to the amplitude/phase adjusters 31-1 to 31-K, in accordance with the combined excitation distribution E(t).

A process of identifying the amounts of adjustment of amplitude and phase from the combined excitation distribution E(t) and outputting control signals indicating the amounts of adjustment of amplitude and phase itself is a publicly known technique and thus detailed description thereof is omitted.

When each of the phase controlling devices 31$a$ in the amplitude/phase adjusters 31-1 to 31-K receives a control signal from the controller 32, the phase controlling device 31$a$ adjusts the phase of the carrier signal divided by the divider 2, in accordance with the amount of phase adjustment indicated by the control signal, and outputs the phase-adjusted carrier signal to a corresponding amplitude controlling device 31$b$ (step ST3 in FIG. 4).

When each of the amplitude controlling devices 31$b$ in the amplitude/phase adjusters 31-1 to 31-K receives a control signal from the controller 32, the amplitude controlling device 31$b$ adjusts the amplitude of the carrier signal outputted from a corresponding phase controlling device 31$a$, in accordance with the amount of amplitude adjustment indicated by the control signal, and outputs the amplitude-adjusted carrier signal to a corresponding one of the element antennas 3-1 to 3-K (step ST4).

By this, the amplitude- and phase-adjusted carrier signals are radiated into space from the element antennas 3-1 to 3-K (step ST5).

A communication beam and an interference beam that are formed by the carrier signals radiated from the element antennas 3-1 to 3-K are, for example, those shown in FIG. 8. In the example illustrated in FIG. 8, since the amplitude characteristic of the communication beam is G1, a main lobe has its peak at 0 degrees. In addition, since the amplitude characteristic of the interference beam is G2, a null of an antenna pattern is formed in a 0-degree direction. Hence, a receiving station present in the 0-degree direction can receive the communication signal d(t) transmitted by the communication beam, but the interference signal i(t) is not transmitted thereto. Therefore, the communication signal d(t) can be demodulated without being influenced by the interference signal i(t).

In addition, in Embodiment 1, the communication signal d(t) is subjected to a QPSK modulation process and a constellation point is present at a location where the phase is $\pi/4$ (=45 degrees). As shown in FIG. 9, since the phase of the antenna pattern is $\pi/4$ (=45 degrees) in the 0-degree direction, the receiving station present in the 0-degree direction can demodulate the constellation point present at the location where the phase is $\pi/4$ (=45 degrees).

In the sidelobe directions of the communication beam, the gains of the interference beam are larger than the gains of the communication beam.

Hence, receiving stations present in the sidelobe directions of the communication beam are greatly influenced by the interference signal i(t) transmitted by the interference beam and thus even if the receiving stations can receive the communication signal d(t) transmitted by the communication beam, the receiving stations have difficulty in demodulating the communication signal d(t).

Thus, since demodulation of the communication signal d(t) is possible only at an angle at which a communication direction is 0 degrees or at angles near this direction, a communicable area is limited.

As is clear from the above, according to Embodiment 1, the configuration is such that there are provided the communication excitation distribution calculating unit 11 that calculates an excitation distribution W1($t$) of a communication beam using an excitation phase distribution S that directs a main lobe of the communication beam in a communication direction; and the interference excitation distribution calculating unit 14 that calculates an excitation distribution W2($t$) of an interference beam using an excitation phase distribution D that forms a null of an antenna pattern in the communication direction, and the excitation distribution combining unit 20 combines the excitation distribution W1($t$) of the communication beam calculated by the communication excitation distribution calculating unit and the excitation distribution W2($t$) of the interference beam calculated by the interference excitation distribution calculating unit 14, and thus, an advantageous effect of being able to reduce the amount of computation for an excitation distribution for the array antenna 3 that is used to implement secure communication with a limited communicable area is provided.

In addition, according to Embodiment 1, the configuration is such that there is provided the weight setting unit 19 that sets weights m and n for the excitation distribution W1($t$) of the communication beam calculated by the communication excitation distribution calculating unit 11 and the excitation distribution W2($t$) of the interference beam calculated by the interference excitation distribution calculating unit 14, and the excitation distribution combining unit 20 combines the excitation distribution W1($t$) of the communication beam and the excitation distribution W2($t$) of the interference beam, in accordance with the weights m and n set by the weight setting unit 19, and thus, an advantageous effect of being able to change the range of a communicable area as appropriate is provided.

According to Embodiment 1, the configuration is such that there is provided the beam-scanning phase distribution setting unit 18 that sets a beam-scanning phase distribution P that determines the communication direction, and the excitation distribution combining unit combines the excitation distribution W1(*t*) of the communication beam and the excitation distribution W2(*t*) of the interference beam and calculates a combined excitation distribution E(t) by multiplying the combined excitation distribution by a diagonal matrix of the beam-scanning phase distribution P set by the beam-scanning phase distribution setting unit 18, and thus, an advantageous effect of being able to change the communication direction as appropriate is provided.

In addition, according to Embodiment 1, the configuration is such that the interference excitation distribution calculating unit 14 sets an excitation amplitude distribution A in which gains of the interference beam are increased in directions corresponding to sidelobe directions of the communication beam, and multiplies an interference signal i(t) by a diagonal matrix of the excitation amplitude distribution A, and thus, the sidelobe gains of the communication beam can be relatively reduced compared to the gains of the interference beam. Hence, an advantageous effect of being able to improve secrecy by making it difficult for receiving stations present in the sidelobe directions of the communication beam to demodulate the communication signal d(t) is provided.

In Embodiment 1, an example is shown in which while a communication signal d(t) and an interference signal i(t) are generated, a combined excitation distribution E(t) is calculated as an excitation distribution for the array antenna 3.

This is merely an example. The excitation distribution combining unit 20 may calculate beforehand a combined excitation distribution E(t) for a communication signal d(t) and an interference signal i(t), and store the combined excitation distribution E(t) in a storage device such as the memory 51. Then, when a communication signal d(t) and an interference signal i(t) are received, a combined excitation distribution E(t) for the communication signal d(t) and the interference signal i(t) may be read from the memory 51, and the combined excitation distribution E(t) may be outputted to the amplitude/phase controlling unit 30.

In Embodiment 1, an example is shown in which the beam-scanning phase distribution setting unit 18 that sets a beam-scanning phase distribution P is provided, and the excitation distribution combining unit 20 multiplies an excitation distribution which is obtained by combining an excitation distribution W1(*t*) of a communication beam and an excitation distribution W2(*t*) of an interference beam, by a diagonal matrix of the beam-scanning phase distribution P.

This is merely an example. Alternatively, two beam-scanning phase distribution setting units 18 may be implemented, and an excitation distribution W1(*t*) of a communication beam may be multiplied by a diagonal matrix of a beam-scanning phase distribution P1 set by one of the beam-scanning phase distribution setting units 18, and an excitation distribution W2(*t*) of an interference beam may be multiplied by a diagonal matrix of a beam-scanning phase distribution P2 set by the other beam-scanning phase distribution setting unit 18. Then, the excitation distribution combining unit 20 may combine the excitation distribution W1(*t*) of the communication beam multiplied by the diagonal matrix of the beam-scanning phase distribution P1 and the excitation distribution W2(*t*) of the interference beam multiplied by the diagonal matrix of the beam-scanning phase distribution P2.

Embodiment 2

In the above-described Embodiment 1, an example is shown in which in order to relatively reduce the sidelobe gains of a communication beam compared to the gains of an interference beam, the interference excitation distribution calculation processing unit 17 multiplies an interference signal i(t) by a diagonal matrix of an excitation amplitude distribution A set by the difference-pattern excitation amplitude distribution setting unit 16.

In this Embodiment 2, an example will be described in which the communication excitation distribution calculation processing unit 13 multiplies a communication signal d(t) by a diagonal matrix of an excitation amplitude distribution in which a gain in a sidelobe direction of a communication beam is reduced.

Figure 10:
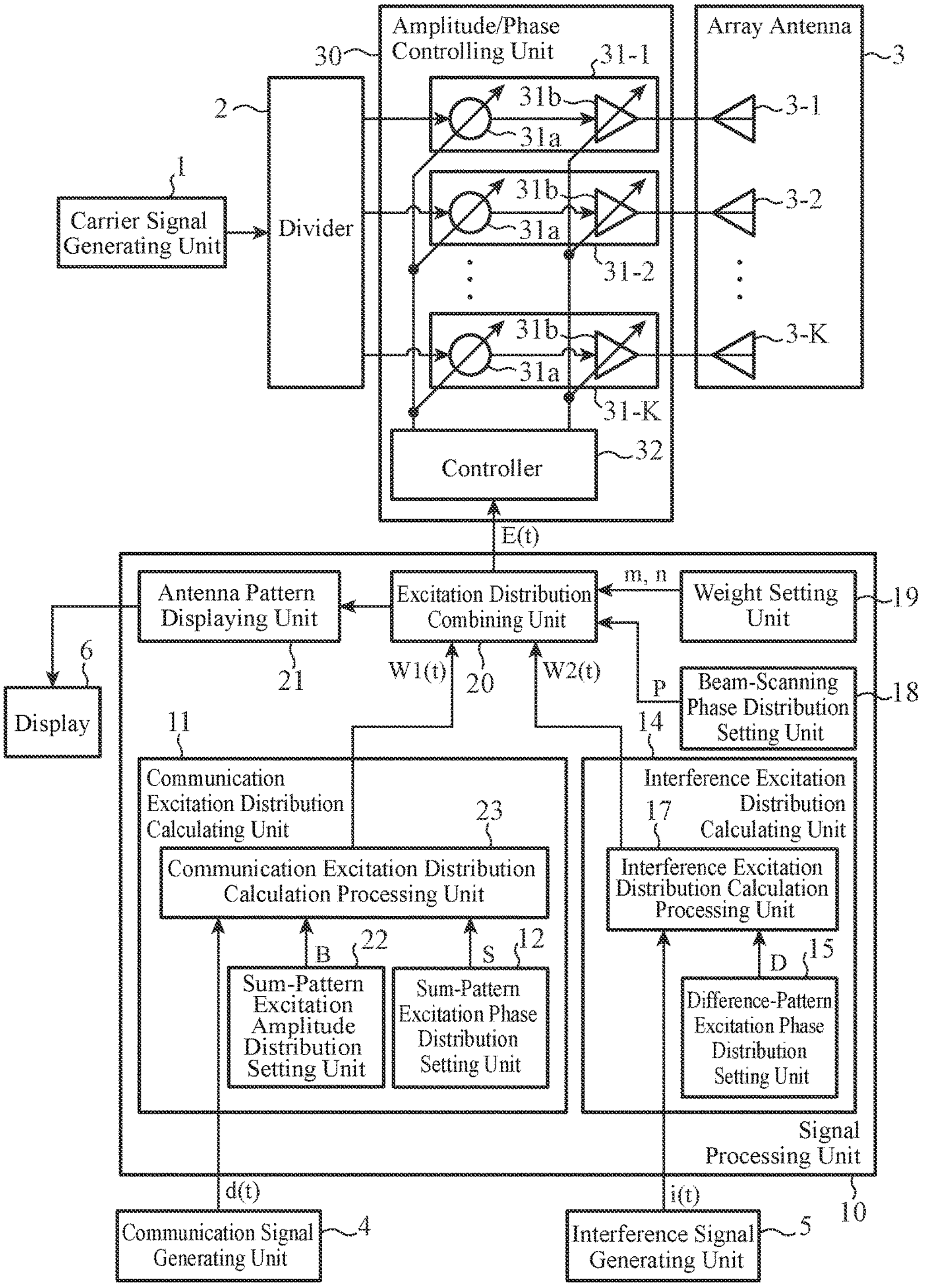
FIG. 10 is a configuration diagram showing an antenna apparatus in accordance with Embodiment 2 of the disclosure.
Figure 11:
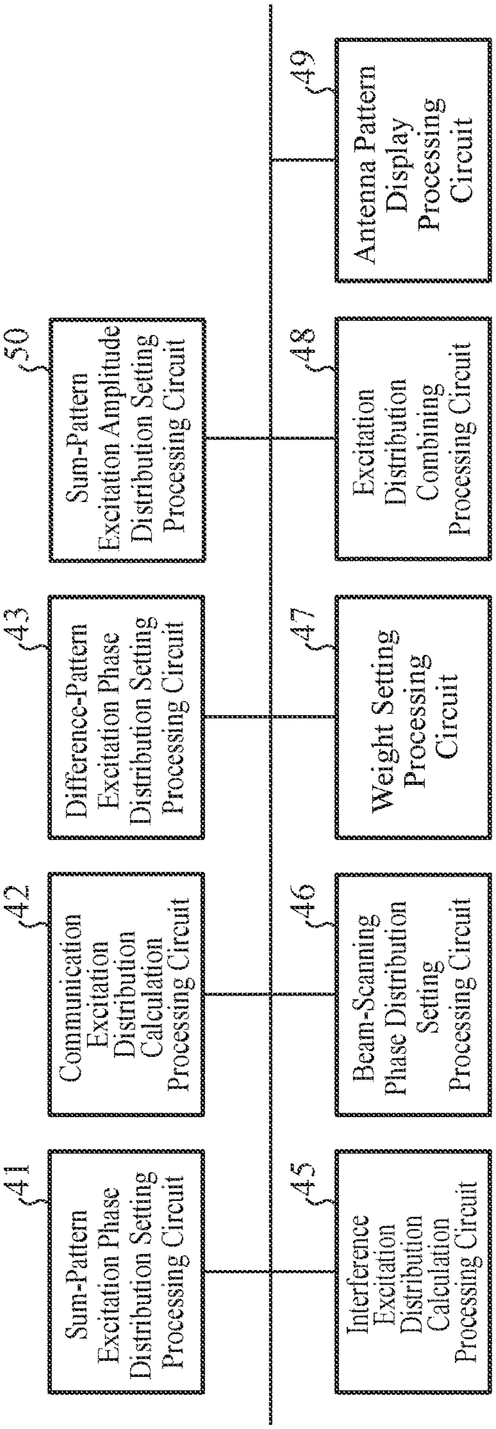
FIG. 11 is a hardware configuration diagram of a signal processing unit 10 of the antenna apparatus in accordance with Embodiment 2 of the disclosure.

FIG. 10 is a configuration diagram showing an antenna apparatus of Embodiment 2 of the invention, and FIG. 11 is a hardware configuration diagram of a signal processing unit 10 of the antenna apparatus of Embodiment 2 of the invention.

In FIGS. 10 and 11, the same reference signs as those in FIGS. 1 and 2 indicate the same or corresponding portions and thus description thereof is omitted.

A sum-pattern excitation amplitude distribution setting unit 22 is implemented by, for example, a sum-pattern excitation amplitude distribution setting processing circuit 50 shown in FIG. 11.

The sum-pattern excitation amplitude distribution setting unit 22 performs a process of setting an excitation amplitude distribution B in which a gain in a sidelobe direction of a communication beam is reduced.

A communication excitation distribution calculation processing unit 23 is implemented by, for example, a communication excitation distribution calculation processing circuit 42 shown in FIG. 11.

The communication excitation distribution calculation processing unit 23 performs a process of calculating an excitation distribution W1(*t*) of the communication beam using an excitation phase distribution S set by the sum-pattern excitation phase distribution setting unit 12 and the excitation amplitude distribution B set by the sum-pattern excitation amplitude distribution setting unit 22.

Next, operation will be described.

Processing operations other than those of the communication excitation distribution calculating unit 11 and the interference excitation distribution calculating unit 14 are the same as those in the above-described Embodiment 1, and thus, here only the processing operations of the communication excitation distribution calculating unit 11 and the interference excitation distribution calculating unit 14 will be described.

The sum-pattern excitation amplitude distribution setting unit 22 in the communication excitation distribution calculating unit 11 sets a sum-pattern excitation amplitude distribution B in which a gain in a sidelobe direction of a communication beam is reduced, to make it difficult to demodulate a communication signal d(t) in the sidelobe direction of the communication beam.

The sum-pattern excitation amplitude distribution B is represented by a matrix with K rows and one column, and for example, each element of the matrix is a positive integer.

For the sum-pattern excitation amplitude distribution B, for example, Taylor distribution, etc., can be used.

The sum-pattern excitation phase distribution setting unit 12 in the communication excitation distribution calculating unit 11 sets a sum-pattern excitation phase distribution S as in the above-described Embodiment 1.

As shown in Equation (6) below, the communication excitation distribution calculation processing unit 23 in the communication excitation distribution calculating unit calculates an excitation distribution W1($t$) of the communication beam by multiplying the communication signal d(t) outputted from the communication signal generating unit 4 by the sum-pattern excitation phase distribution S and a diagonal matrix of the excitation amplitude distribution B:

$$W1(t)=d(t)\cdot\mathrm{diag}(B)\cdot S \qquad (6)$$

In Eq. (6), diag(B) is the diagonal matrix having B as diagonal elements.

When the difference-pattern excitation phase distribution setting unit 15 sets an excitation phase distribution D as in the above-described Embodiment 1, as shown in Equation (7) below, the interference excitation distribution calculation processing unit 17 calculates an excitation distribution W2($t$) of an interference beam by multiplying an interference signal i(t) outputted from the interference signal generating unit 5 by the excitation phase distribution D:

$$W2(t)=i(t)\cdot D \qquad (7)$$

As is clear from the above, according to Embodiment 2, the configuration is such that the communication excitation distribution calculating unit 11 sets a sum-pattern excitation amplitude distribution B in which the gain in sidelobe direction of the communication beam is reduced, and multiplies a communication signal d(t) by a diagonal matrix of the excitation amplitude distribution B, and thus, the sidelobe gains of the communication beam can be relatively reduced compared to the gains of an interference beam. Hence, an advantageous effect of being able to improve secrecy by making it difficult for receiving stations present in the sidelobe directions of the communication beam to demodulate the communication signal d(t) is provided.

Embodiment 3

In the above-described Embodiment 1, an example is shown in which in order to relatively reduce the sidelobe gains of a communication beam compared to the gains of an interference beam, the interference excitation distribution calculation processing unit 17 multiplies an interference signal i(t) by a diagonal matrix of an excitation amplitude distribution A set by the difference-pattern excitation amplitude distribution setting unit 16.

In this Embodiment 3, furthermore, the communication excitation distribution calculation processing unit 13 may multiply a communication signal d(t) by a diagonal matrix of an excitation amplitude distribution B in which the gain in sidelobe direction of the communication beam is reduced.

Figure 12:
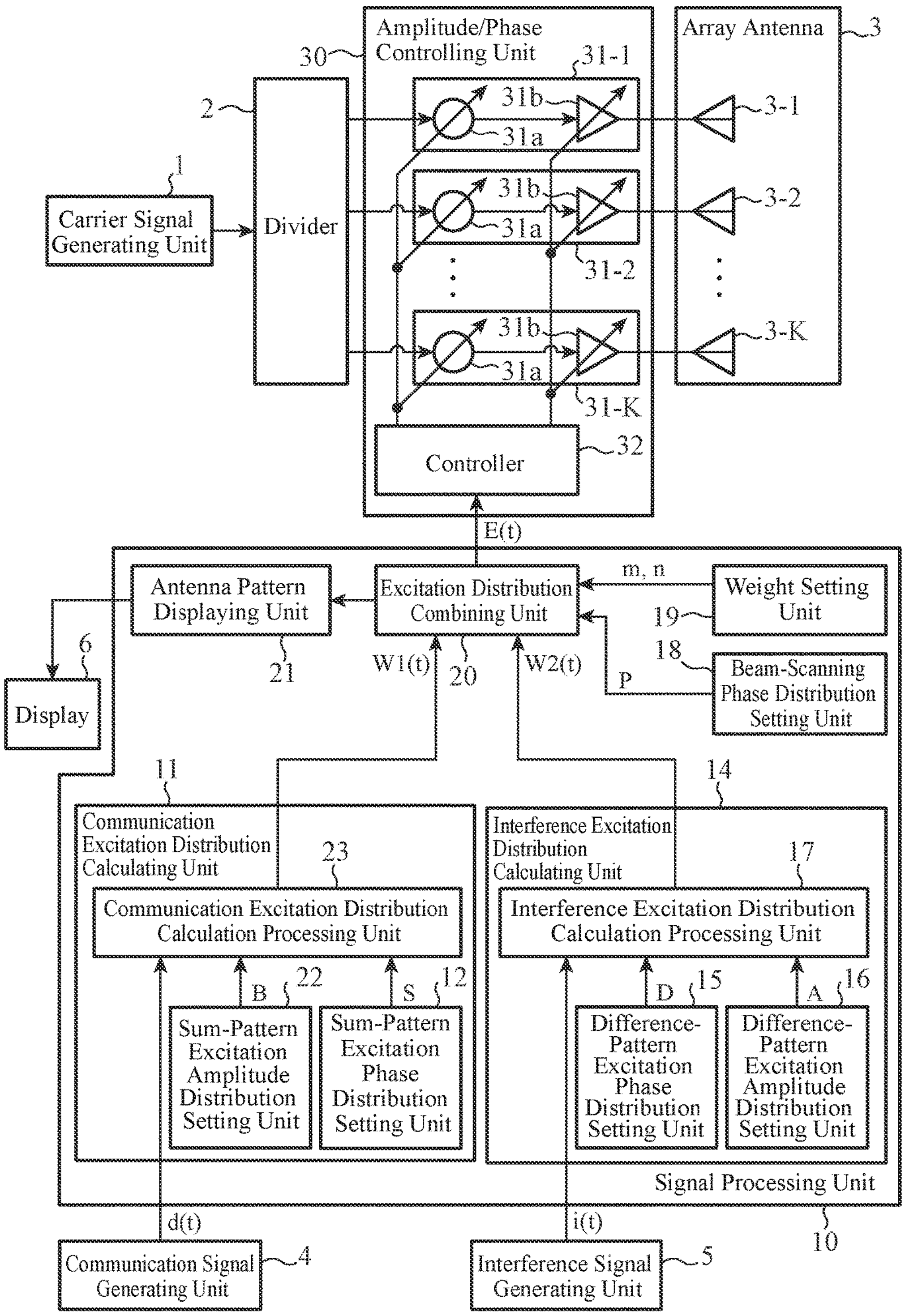
FIG. 12 is a configuration diagram showing an antenna apparatus in accordance with Embodiment 3 of the disclosure.

FIG. 12 is a configuration diagram showing an antenna apparatus of Embodiment 3 of the invention, and in FIG. 12 the same reference signs as those in FIGS. 1 and 10 indicate the same or corresponding portions and thus description thereof is omitted.

In Embodiment 3, the sum-pattern excitation amplitude distribution setting unit 22 is mounted on the communication excitation distribution calculating unit 11, and the difference-pattern excitation amplitude distribution setting unit 16 is mounted on the interference excitation distribution calculating unit 14.

Hence, when the sum-pattern excitation phase distribution setting unit 12 sets a sum-pattern excitation phase distribution S and the sum-pattern excitation amplitude distribution setting unit 22 sets a sum-pattern excitation amplitude distribution B, as in the above-described Embodiment 2, the communication excitation distribution calculation processing unit 23 in the communication excitation distribution calculating unit 11 calculates an excitation distribution W1($t$) of a communication beam by multiplying a communication signal d(t) outputted from the communication signal generating unit 4 by the excitation phase distribution S and a diagonal matrix of the excitation amplitude distribution B.

In addition, when the difference-pattern excitation phase distribution setting unit 15 sets an excitation phase distribution D and the difference-pattern excitation amplitude distribution setting unit 16 sets an excitation amplitude distribution A, as in the above-described Embodiment 1, the interference excitation distribution calculation processing unit 17 in the interference excitation distribution calculating unit 14 calculates an excitation distribution W2($t$) of an interference beam by multiplying an interference signal i(t) outputted from the interference signal generating unit 5 by the excitation phase distribution D and a diagonal matrix of the excitation amplitude distribution A.

By this, as in the above-described first and Embodiment 2s, the sidelobe gains of the communication beam can be relatively reduced compared to the gains of the interference beam. Hence, an advantageous effect of being able to improve secrecy by making it difficult for receiving stations present in sidelobe directions of the communication beam to demodulate the communication signal d(t) is provided.

In Embodiment 3, an example is shown in which in order to relatively reduce the sidelobe gains of the communication beam compared to the gains of the interference beam, the interference excitation distribution calculation processing unit 17 multiplies the interference signal i(t) by the diagonal matrix of the excitation amplitude distribution A set by the difference-pattern excitation amplitude distribution setting unit 16.

This is merely an example, and the communication excitation distribution calculation processing unit 13 may multiply the communication signal d(t) by a diagonal matrix of an excitation amplitude distribution C in which a gain in sidelobe direction of the communication beam is increased within a range not exceeding the gain of the interference beam.

By this, the gains in the sidelobe directions of the communication beam increase within the range in which the gains in the sidelobe directions of the communication beam do not exceed the gains of the interference beam, and thus, the communication signal d(t) increases in the sidelobe directions; however, in this case, too, since the interference signal i(t) is larger than the communication signal d(t), it is difficult to demodulate the communication signal d(t) in the sidelobe directions of the communication beam.

Note that the sum-pattern excitation amplitude distribution C is represented by a matrix with K rows and one column, and for example, each element of the matrix is a positive integer. For the sum-pattern excitation amplitude distribution C, for example, a reverse-tapered excitation amplitude distribution can be used in which, of the element antennas 3-1 to 3-K that form the array antenna 3, element antennas disposed at the edges have a higher excitation amplitude distribution than an element antenna disposed at the center. By using such a reverse-tapered excitation amplitude distribution C, the beam width of the communication beam is narrowed, and thus, narrow coverage of a communication area can also be expected.

Embodiment 4

In the above-described first to Embodiment 3s, an example is shown in which each of the phase controlling devices 31*a* in the amplitude/phase adjusters 31-1 to 31-K adjusts the phase of a carrier signal divide by the divider 2, in accordance with the amount of phase adjustment indicated by a control signal outputted from the controller 32, and each of the amplitude controlling devices 31*b* in the amplitude/phase adjusters 31-1 to 31-K adjusts the amplitude of the carrier signal outputted from a corresponding phase controlling device 31*a*, in accordance with the amount of amplitude adjustment indicated by a control signal outputted from the controller 32.

In this Embodiment 4, the amplitude and phase of a carrier signal may be adjusted by digital signal processing.

Figure 13:
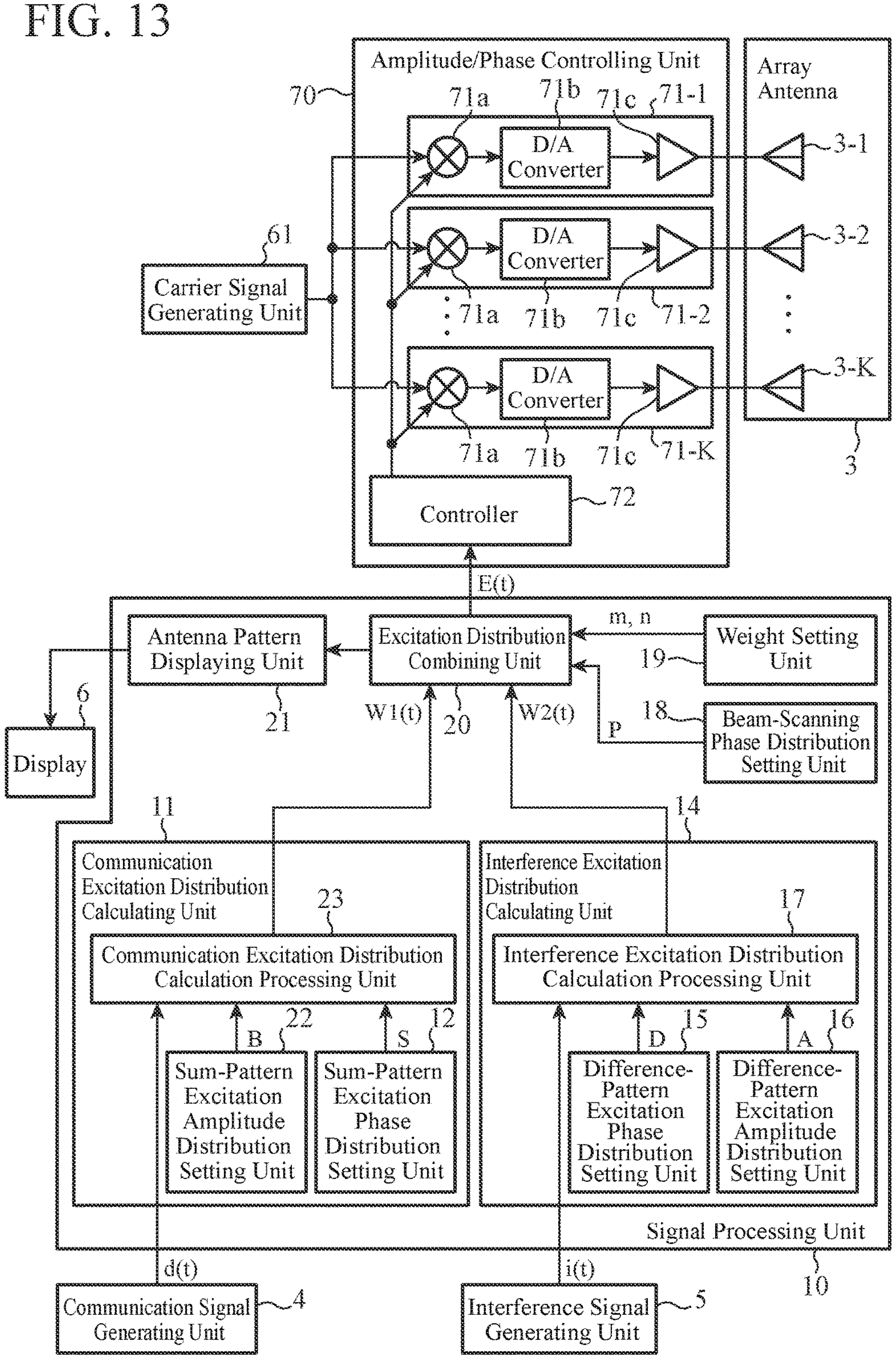
FIG. 13 is a configuration diagram showing an antenna apparatus in accordance with Embodiment 4 of the disclosure.

FIG. 13 is a configuration diagram showing an antenna apparatus of the Embodiment 4 of the invention, and in FIG. 13 the same reference signs as those in FIGS. 1, 10, and 12 indicate the same or corresponding portions and thus description thereof is omitted.

A carrier signal generating unit 61 is a signal oscillator that generates a carrier signal which is a digital signal.

An amplitude/phase controlling unit 70 includes amplitude/phase adjusters 71-1 to 71-K and a controller 72, and controls the amplitudes and phases of carrier signals to be provided to the element antennas 3-1 to 3-K, in accordance with a combined excitation distribution E(t) outputted from the excitation distribution combining unit 20.

The amplitude/phase adjusters 71-1 to 71-K each include a digital signal processor 71*a*, a digital/analog converter (hereinafter, referred to as "D/A converter") 71*b*, and an amplifier 71*c*.

The amplitude/phase adjusters 71-1 to 71-K each adjust the phase of a carrier signal by digital signal processing according to the amount of phase adjustment indicated by a control signal outputted from the controller 72, and adjust the amplitude of the carrier signal by digital signal processing in accordance with the amount of amplitude adjustment indicated by a control signal outputted from the controller 72.

The controller 72 controls the amounts of adjustment of amplitude and phase for the amplitude/phase adjusters 71-1 to 71-K, in accordance with the combined excitation distribution E(t) outputted from the excitation distribution combining unit 20.

The digital signal processors 71*a* in the amplitude/phase adjusters 71-1 to 71-K are implemented by, for example, a semiconductor integrated circuit having a CPU mounted thereon, a single-chip microcomputer, or the like.

Each digital signal processor 71*a* adjusts the amplitude and phase of a carrier signal by digital signal processing.

Each of the D/A converters 71*b* in the amplitude/phase adjusters 71-1 to 71-K converts the carrier signal whose amplitude and phase have been adjusted by a corresponding digital signal processor 71*a* into an analog signal.

Each of the amplifiers 71*c* in the amplitude/phase adjusters 71-1 to 71-K amplifies the carrier signal having been converted into the analog signal by a corresponding D/A converter 71*b*, and outputs the amplified carrier signal to a corresponding one of the element antennas 3-1 to 3-K.

Figure 14:
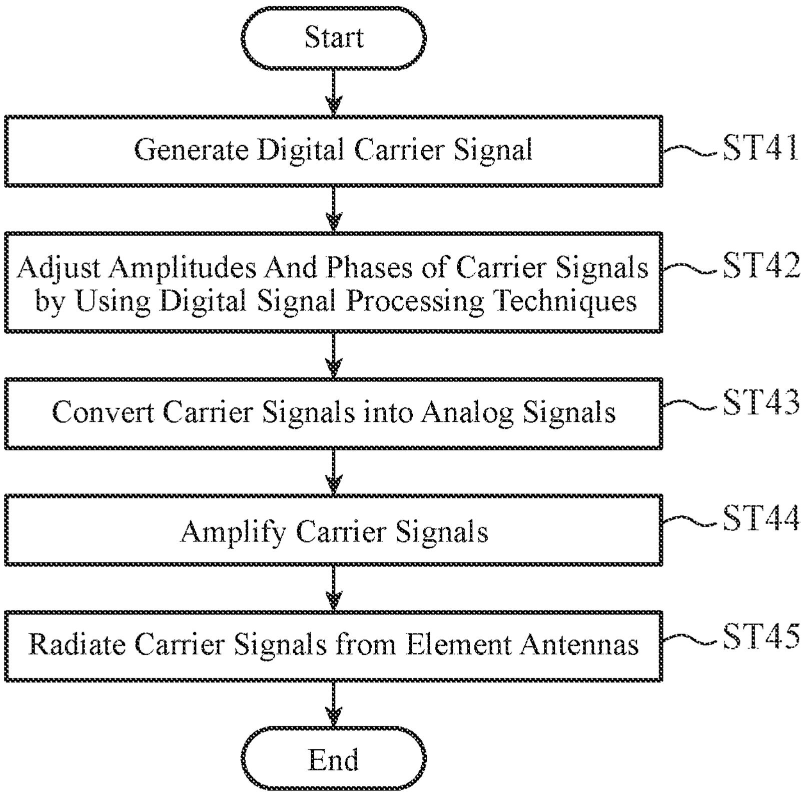
FIG. 14 is a flowchart showing the operation of a carrier signal generating unit 61, an amplitude/phase controlling unit 70, and element antennas 3-1 to 3-K.

FIG. 14 is a flowchart showing the operation of the carrier signal generating unit 61, the amplitude/phase controlling unit 70, and the element antennas 3-1 to 3-K.

Next, operation will be described.

In the Embodiment 4, the processing operations of the signal processing unit 10 are the same as those of the above-described Embodiment 3, and thus, processing operations other than those of the signal processing unit 10 will be described. Note that the processing operations of the signal processing unit 10 may be the same as those of the above-described first and Embodiment 2s.

The carrier signal generating unit 61 generates a carrier signal which is a digital signal, and outputs the carrier signal to the amplitude/phase adjusters 71-1 to 71-K in the amplitude/phase controlling unit 70 (step ST41 in FIG. 14).

When the excitation distribution combining unit 20 in the signal processing unit 10 calculates a combined excitation distribution E(t) as in the above-described Embodiment 3, the controller 72 in the amplitude/phase controlling unit 70 outputs control signals indicating the amounts of adjustment of amplitude and phase for the amplitude/phase adjusters 71-1 to 71-K to the amplitude/phase adjusters 71-1 to 71-K, in accordance with the combined excitation distribution E(t).

A process of identifying the amounts of adjustment of amplitude and phase from the combined excitation distribution E(t) and outputting control signals indicating the amounts of adjustment of amplitude and phase itself is a publicly known technique and thus detailed description thereof is omitted.

When each of the digital signal processors 71*a* in the amplitude/phase adjusters 71-1 to 71-K receives the control signals from the controller 72, the digital signal processor 71*a* adjusts the phase of the carrier signal outputted from the carrier signal generating unit 61 by digital signal processing in accordance with the amount of phase adjustment indicated by the control signal, and adjusts the amplitude of the carrier signal by digital signal processing in accordance with the amount of amplitude adjustment indicated by the control signal (step ST42).

When each of the D/A converters 71*b* in the amplitude/phase adjusters 71-1 to 71-K receives the amplitude- and phase-adjusted carrier signal from a corresponding digital signal processor 71*a*, the D/A converter 71*b* converts the carrier signal into an analog signal and outputs the analog carrier signal to a corresponding amplifier 71*c* (step ST43).

When each of the amplifiers 71*c* in the amplitude/phase adjusters 71-1 to 71-K receives the analog carrier signal from a corresponding D/A converter 71*b*, the amplifier 71*c* amplifies the carrier signal and outputs the amplified carrier signal to a corresponding one of the element antennas 3-1 to 3-K (step ST44).

By this, the amplitude- and phase-adjusted carrier signals are radiated into space from the element antennas 3-1 to 3-K (step ST45).

A communication beam and an interference beam that are formed by the carrier signals radiated from the element antennas 3-1 to 3-K are, for example, those shown in FIG. 8. In the example illustrated in FIG. 8, since the amplitude characteristic of the communication beam is G1, a main lobe has its peak at 0 degrees. In addition, since the amplitude characteristic of the interference beam is G2, a null of an antenna pattern is formed in a 0-degree direction. Hence, a receiving station present in the 0-degree direction can receive a communication signal d(t) transmitted by the communication beam, but an interference signal i(t) is not transmitted thereto. Therefore, the communication signal d(t) can be demodulated without being influenced by the interference signal i(t).

In addition, in the Embodiment 4, the communication signal d(t) is subjected to a QPSK modulation process and a constellation point is present at a location where the phase is π/4 (=45 degrees). As shown in FIG. 9, since the phase of the antenna pattern is π/4 (=45 degrees) in the 0-degree direction, the receiving station present in the 0-degree direction can demodulate the constellation point present at the location where the phase is π/4 (=45 degrees).

In the sidelobe directions of the communication beam, the gains of the interference beam are larger than the gains of the communication beam.

Hence, receiving stations present in the sidelobe directions of the communication beam are greatly influenced by the interference signal i(t) transmitted by the interference beam and thus even if the receiving stations can receive the communication signal d(t) transmitted by the communication beam, the receiving stations have difficulty in demodulating the communication signal d(t).

Thus, since demodulation of the communication signal d(t) is possible only at angles near a communication direction of 0 degrees, a communicable area is limited.

As is clear from the above, according to the Embodiment 4, the configuration is such that there are provided the communication excitation distribution calculating unit 11 that calculates an excitation distribution W1(*t*) of a communication beam using an excitation phase distribution S that directs a main lobe of the communication beam in a communication direction; and the interference excitation distribution calculating unit 14 that calculates an excitation distribution W2(*t*) of an interference beam using an excitation phase distribution D that forms a null of an antenna pattern in the communication direction, and the excitation distribution combining unit 20 combines the excitation distribution W1(*t*) of the communication beam calculated by the communication excitation distribution calculating unit and the excitation distribution W2(*t*) of the interference beam calculated by the interference excitation distribution calculating unit 14, and thus, an advantageous effect of being able to reduce the amount of computation for an excitation distribution for the array antenna that is used to implement secure communication with a limited communicable area is provided.

In addition, according to the Embodiment 4, the configuration is such that the amplitude/phase adjusters 71-1 to 71-K each adjust the phase of a carrier signal by digital signal processing in accordance with the amount of phase adjustment indicated by a control signal outputted from the controller 72, and adjusts the amplitude of the carrier signal by digital signal processing in accordance with the amount of amplitude adjustment indicated by a control signal outputted from the controller 72, and thus, an advantageous effect of being able to increase the formation accuracy of an antenna pattern compared to the above-described first to Embodiment 3s is provided.

Embodiment 5

In the above-described first to Embodiment 4s, an example in which an interference signal i(t) and a communication signal d(t) are independently generated is shown.

In this Embodiment 5, an example in which an interference signal i(t) is generated from a communication signal d(t) generated by the communication signal generating unit 4 will be described.

Figure 15:
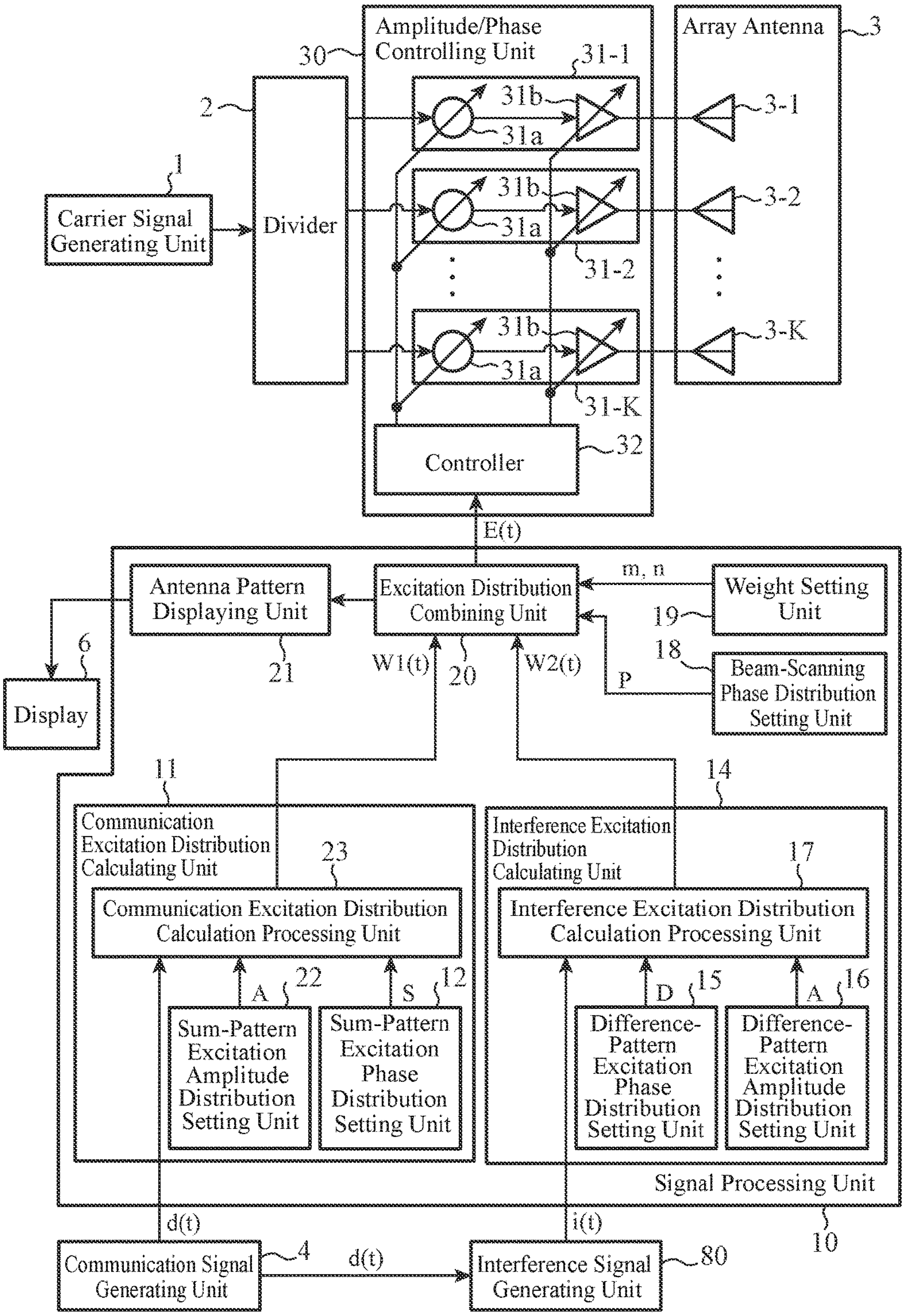
FIG. 15 is a configuration diagram showing an antenna apparatus in accordance with Embodiment 5 of the disclosure.

FIG. 15 is a configuration diagram showing an antenna apparatus of the Embodiment 5 of the invention, and in FIG. 15 the same reference signs as those in FIGS. 1, 10, and 12 indicate the same or corresponding portions and thus description thereof is omitted.

An interference signal generating unit 80 includes a phase adjuster 81, and performs a process of generating an interference signal i(t) which serves as a disturbing wave for a communication signal d(t) generated by the communication signal generating unit 4, by adjusting the phase of the communication signal d(t), and outputting the interference signal i(t) to the interference excitation distribution calculation processing unit 17.

Figure 16:
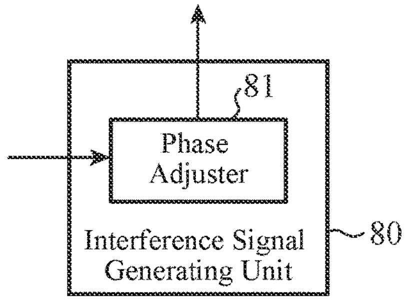
FIG. 16 is a configuration diagram showing an interference signal generating unit 80 of the antenna apparatus in accordance with the Embodiment 5 of the disclosure.

FIG. 16 is a configuration diagram showing the interference signal generating unit 80 of the antenna apparatus of the Embodiment 5 of the invention.

In FIG. 16, the phase adjuster 81 is implemented by, for example, a semiconductor integrated circuit having a CPU mounted thereon, a single-chip microcomputer, or the like. Alternatively, the phase adjuster 81 is implemented by a phase shifter.

The phase adjuster 81 generates an interference signal i(t) by shifting the phase of a communication signal d(t) generated by the communication signal generating unit 4 by 90 degrees or −90 degrees.

Figure 17:
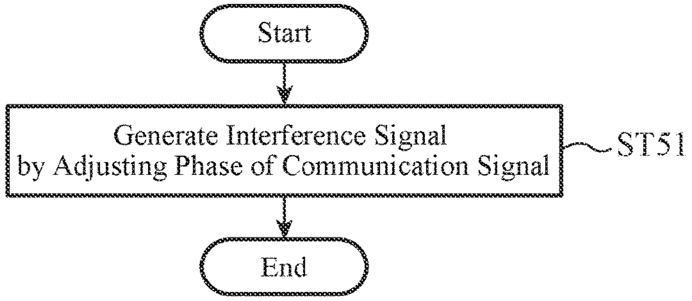
FIG. 17 is a flowchart showing the processing operation of a phase adjuster 81 in the interference signal generating unit 80.

FIG. 17 is a flowchart showing the processing operation of the phase adjuster 81 in the interference signal generating unit 80.

Next, operation will be described.

When the phase adjuster 81 in the interference signal generating unit 80 receives a communication signal d(t) from the communication signal generating unit 4, the phase adjuster 81 generates an interference signal i(t) which serves as a disturbing wave by adjusting the phase of the communication signal d(t), and outputs the interference signal i(t) to the interference excitation distribution calculation processing unit 17 (step ST51 in FIG. 17).

For example, the phase adjuster 81 generates an interference signal i(t) by shifting the phase of the communication signal d(t) by 90 degrees or −90 degrees.

Specifically, when a communication signal d(t) at time t which uses a QPSK modulation scheme is exp(jπ/4), if the communication signal d(t) has a phase difference of π/2 (=90 degrees), then an interference signal i(t) is exp(j3π/4).

Therefore, the interference signal i(t) is represented as shown in Equation (8) below:

$$i(t)=d(t)\cdot\exp(j\pi/2)=j\cdot d(t) \quad (8)$$

Note that the sign of the phase difference of the interference signal i(t) from the communication signal d(t) may be fixed or may be randomly switched.

Note also that the sign of the phase difference may be switched for every modulation symbol of the communication signal d(t).

Specific description is as follows.

For example, when the phase of a communication signal d(t) at given time t is present in the first quadrant like when the communication signal d(t) is exp(jπ/4), the phase difference between the communication signal d(t) and the interference signal i(t) is a first phase difference.

When the phase of the communication signal d(t) at given time t is present in the second quadrant like when the communication signal d(t) is exp(−j3π/4), the phase difference between the communication signal d(t) and the interference signal i(t) is a second phase difference.

In addition, when the phase of the communication signal d(t) at given time t is present in the third quadrant like when the communication signal d(t) is exp(j3π/4), the phase difference between the communication signal d(t) and the interference signal i(t) is a third phase difference.

Furthermore, when the phase of the communication signal d(t) at given time t is present in the fourth quadrant like when the communication signal d(t) is exp(−jπ/4), the phase difference between the communication signal d(t) and the interference signal i(t) is a fourth phase difference.

At this time, the interference signal i(t) is generated such that the first phase difference and the third phase difference are of different signs. For example, the interference signal i(t) is generated such that the first phase difference is exp(jπ/2) and the third phase difference is exp(−jπ/2).

In addition, the interference signal i(t) is generated such that the second phase difference and the fourth phase difference are of different signs. For example, the interference signal i(t) is generated such that the second phase difference is exp(−jπ/2) and the fourth phase difference is exp(jπ/2).

As in the above-described Embodiment 1, the communication excitation distribution calculation processing unit 23 in the communication excitation distribution calculating unit 11 calculates an excitation distribution W1(*t*) of a communication beam by multiplying a communication signal d(t) outputted from the communication signal generating unit 4 by an excitation phase distribution S and a diagonal matrix of an excitation amplitude distribution A.

As in the above-described Embodiment 1, the interference excitation distribution calculation processing unit 17 in the interference excitation distribution calculating unit 14 calculates an excitation distribution W2(*t*) of an interference beam by multiplying an interference signal i(t) outputted from the interference signal generating unit 80 by an excitation phase distribution D and a diagonal matrix of an excitation amplitude distribution A.

Here, the excitation amplitude distribution A of the communication beam which is used by the communication excitation distribution calculation processing unit 23 to calculate the excitation distribution W1(*t*) of the communication beam and the excitation amplitude distribution A of the interference beam which is used by the interference excitation distribution calculation processing unit 17 to calculate the excitation distribution W2(*t*) of the interference beam are identical excitation amplitude distributions.

Figure 18:
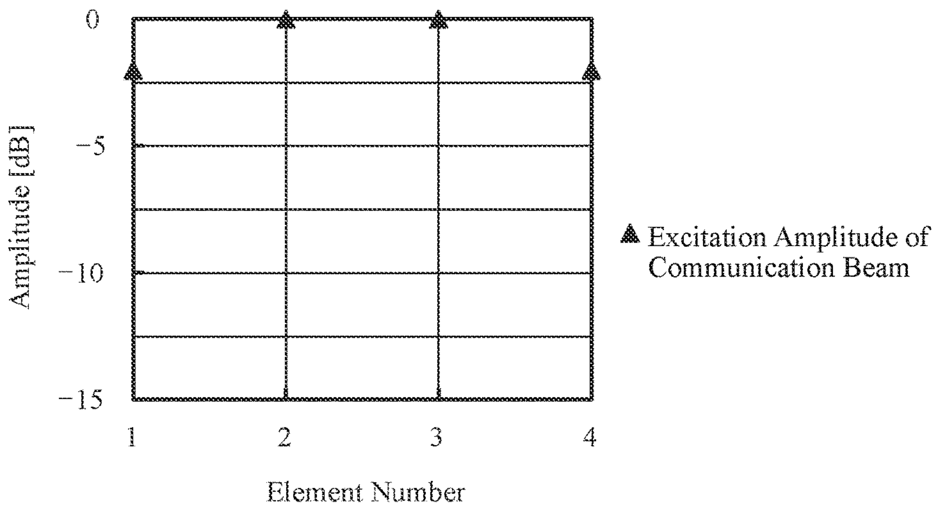
FIG. 18 is an illustrative diagram showing an excitation amplitude distribution A of a communication beam which is the same as an excitation amplitude distribution A of an interference beam.

FIG. 18 is an illustrative diagram showing an excitation amplitude distribution A of a communication beam which is the same as an excitation amplitude distribution A of an interference beam.

FIG. 18 shows an example in which the number of element antennas included in the array antenna 3 is four.

The example illustrated in FIG. 18 shows an excitation amplitude distribution A in which, of four element antennas 3-1 to 3-4, the element antennas 3-1 and 3-4 at the edges have a smaller excitation amplitude of the communication beam than the element antennas 3-2 and 3-3 which are other than those at the edges.

Figure 19:
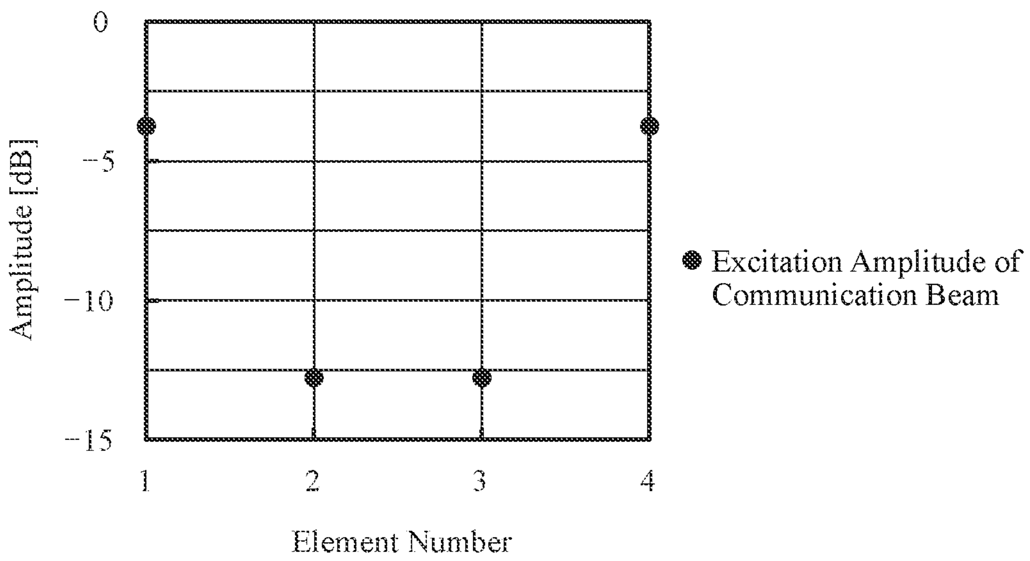
FIG. 19 is an illustrative diagram showing an excitation amplitude distribution A of a communication beam which is the same as an excitation amplitude distribution A of an interference beam.

Note, however, that this is an example and, as shown in FIG. 19, the excitation amplitude distribution A may be such that the element antennas 3-1 and 3-4 at the edges have a larger excitation amplitude of the communication beam than the element antennas 3-2 and 3-3 which are other than those at the edges.

FIG. 19 is an illustrative diagram showing an excitation amplitude distribution A of a communication beam which is the same as an excitation amplitude distribution A of an interference beam.

As in the above-described Embodiment 1, the excitation distribution combining unit 20 combines the excitation distribution W1(*t*) of the communication beam calculated by the communication excitation distribution calculation processing unit 23 and the excitation distribution W2(*t*) of the interference beam calculated by the interference excitation distribution calculation processing unit 17, in accordance with weights m and n set by the weight setting unit 19.

Then, as shown in Equation (9) below, the excitation distribution combining unit 20 calculates a combined excitation distribution E(t) by multiplying the excitation distribution which is obtained by combining the excitation distribution W1(*t*) and the excitation distribution W2(*t*), by a diagonal matrix of a beam-scanning phase distribution P set by the beam-scanning phase distribution setting unit 18:

$$
\begin{aligned}
E(t) &= \mathrm{diag}(P)\cdot\{m\cdot W1(t)+n\cdot W2(t)\} \qquad (9)\\
&= \mathrm{diag}(P)\cdot\{m\cdot d(t)\cdot\mathrm{diag}(A)\cdot S+n\cdot i(t)\cdot\mathrm{diag}(A)\cdot D\}\\
&= \mathrm{diag}(P)\cdot\mathrm{diag}(A)\cdot d(t)\cdot\begin{bmatrix} m-jn\\ \vdots\\ m-jn\\ m+jn\\ \vdots\\ m+jn\end{bmatrix}
\end{aligned}
$$

Here, since the amplitudes of the respective elements of a column vector in the fourth term on the right side of Eq. (9) are identical, an excitation amplitude distribution of the combined excitation distribution E(t) is represented by diag (A).

Therefore, even if the phase of the modulation symbol is changed, the same combined excitation distribution E(t) can be obtained.

As is clear from the above, according to the Embodiment 5, the configuration is such that there is provided the interference signal generating unit 80 that generates an interference signal i(t) which serves as a disturbing wave for a communication signal d(t) generated by the communication signal generating unit 4, by adjusting the phase of the communication signal d(t), and an excitation amplitude distribution A of a communication beam and an excitation amplitude distribution A of an interference beam are identical excitation amplitude distributions, and thus, it is possible to eliminate the need for excitation amplitude control on a per symbol of a combined excitation distribution E(t) basis while secure communication with a limited communicable area is implemented.

In the antenna apparatuses in FIGS. 1, 10, 12, 13, and 15 in Embodiments 1 to 5 described above, a linear array antenna in which the element antennas 3-1 to 3-K of the array antenna 3 are linearly arranged is assumed.

However, the array antenna 3 is not limited to a linear array antenna and, for example, a planar array antenna in which the element antennas 3-1 to 3-K of the array antenna 3 are two-dimensionally disposed in the same plane may be used. Alternatively, for example, a conformal array antenna in which the element antennas 3-1 to 3-K of the array antenna 3 are disposed along a curved surface may be used.

FIG. 20 is an illustrative diagram showing examples of the array antenna 3.

Figure 20A:
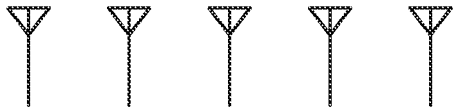
FIG. 20A is an illustrative diagram showing an example of a linear array antenna.
Figure 20B:
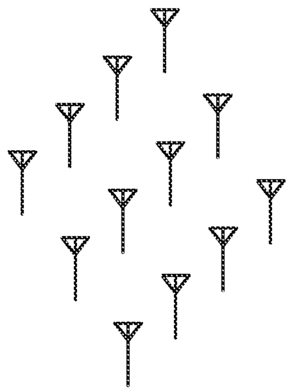
FIG. 20B is an illustrative diagram showing an example of a planar array antenna.
Figure 20C:
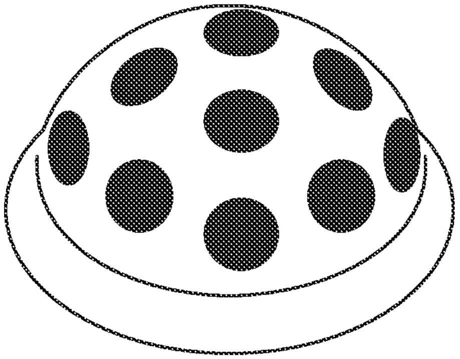
FIG. 20C is an illustrative diagram showing an example of a conformal array antenna.

FIG. 20A shows an example of a linear array antenna, FIG. 20B shows an example of a planar array antenna, and FIG. 20C shows an example of a conformal array antenna.

Note that, in the invention of the present application, a free combination of the embodiments, modifications to any component in the embodiments, or omissions of any component in the embodiments are possible within the scope of the invention.

INDUSTRIAL APPLICABILITY

Embodiments of the disclosure are suitable for use as antenna apparatuses and antenna excitation methods that control the amplitudes and phases of carrier signals to be provided to a plurality of element antennas included in an array antenna.

REFERENCE SIGNS LIST

1: Carrier signal generating unit, 2: Divider, 3: Array antenna, 3-1 to 3-K: Element antenna, 4: Communication signal generating unit, 5: Interference signal generating unit, 6: Display, 10: Signal processing unit, 11: Communication excitation distribution calculating unit, 12: Sum-pattern excitation phase distribution setting unit, 13 and 23: Communication excitation distribution calculation processing unit, 14: Interference excitation distribution calculating unit, 15: Difference-pattern excitation phase distribution setting unit, 16: Difference-pattern excitation amplitude distribution setting unit, 17: Interference excitation distribution calculation processing unit, 18: Beam-scanning phase distribution setting unit, 19: Weight setting unit, 20: Excitation distribution combining unit, 21: Antenna pattern displaying unit, 22: Sum-pattern excitation amplitude distribution setting unit, 30: Amplitude/phase controlling unit, 31-1 to 31-K: Amplitude/phase adjuster, 31*a*: Phase controlling device, 31*b*: Amplitude controlling device, 32: Controller, 41: Sum-pattern excitation phase distribution setting processing circuit, 42: Communication excitation distribution calculation processing circuit, 43: Difference-pattern excitation phase distribution setting processing circuit, 44: Difference-pattern excitation amplitude distribution setting processing circuit, 45: Interference excitation distribution calculation processing circuit, 46: Beam-scanning phase distribution setting processing circuit, 47: Weight setting processing circuit, 48: Excitation distribution combining processing circuit, 49: Antenna pattern display processing circuit, 50: Sum-pattern excitation amplitude distribution setting processing circuit, 51: Memory, 52: Processor, 53: Input interface device, 54: Output interface device, 55: Display interface device, 61: Carrier signal generating unit, 70: Amplitude/phase controlling unit, 71-1 to 71-K: Amplitude/phase adjuster, 71*a*: Digital signal processor, 71*b*: D/A converter, 71*c*: Amplifier, 72: Controller, 80: Interference signal generating unit, and 81: Phase adjuster

The invention claimed is:

1. An antenna apparatus comprising:

an array antenna including a plurality of element antennas for radiating carrier signals;

processing circuitry to generate a communication signal that is a signal to be communicated;

to generate an interference signal serving as a disturbing wave for the communication signal;

to calculate an excitation distribution of a communication beam by using an excitation phase distribution that directs a main lobe of the communication beam toward a communication direction, the communication beam being a radio wave that transmits the communication signal;

to calculate an excitation distribution of an interference beam by using an excitation phase distribution that forms a null of an antenna pattern in the communication direction, the interference beam being a radio wave that transmits the interference signal;

to combine the calculated excitation distribution of the communication beam and the calculated excitation distribution of the interference beam; and an amplitude/phase controller for controlling amplitudes and phases of carrier signals to be provided to the plurality of element antennas in accordance with the combined excitation distribution.

2. The antenna apparatus according to claim 1, comprising:

a carrier signal generator for generating a carrier signal; and a divider for dividing the carrier signal generated by the carrier signal generator, wherein the amplitude/phase controller includes:

a plurality of amplitude/phase adjusters each for adjusting-an amplitude and a phase of one of the plurality of carrier signals divided by the divider, and outputting the amplitude- and phase-adjusted carrier signal to one of the plurality of element antennas; and a controller for controlling an amount of adjustment of amplitude and phase for each amplitude/phase adjuster in accordance with the combined excitation distribution.

3. The antenna apparatus according to claim 1, comprising a carrier signal generator for generating a carrier signal that is a digital signal, wherein the amplitude/phase controller includes:

a plurality of digital signal processors each for adjusting an amplitude and a phase of the carrier signal generated by the carrier signal generator;

a plurality of digital/analog converters each for converting the carrier signal whose amplitude and phase are adjusted by one of the plurality of digital signal processors into an analog signal, and outputting the analog signal to one of the plurality of element antennas; and a controller for controlling an amount of adjustment of amplitude and phase for each digital signal processor in accordance with the combined excitation distribution.

4. The antenna apparatus according to claim 1, wherein the processing circuitry is further configured to set weights for the calculated excitation distribution of the communication beam and the calculated excitation distribution of the interference beam, to combine the excitation distribution of the communication beam and the excitation distribution of the interference beam in accordance with the set weights.

5. The antenna apparatus according to claim 1, wherein the processing circuitry is further configured to set a beam-scanning phase distribution that determines the communication direction, to combine the calculated excitation distribution of the communication beam and the calculated excitation distribution of the interference beam, multiply the combined excitation distribution by the set beam-scanning phase distribution, and output the excitation distribution multiplied by the beam-scanning phase distribution to the amplitude/phase controller, as a combined excitation distribution.

6. The antenna apparatus according to claim 1, wherein the processing circuitry is further configured to set an excitation amplitude distribution in which a gain of the interference beam is increased in a direction corresponding to a sidelobe direction of the communication beam, multiply the excitation distribution of the interference beam by the excitation amplitude distribution, and output the excitation distribution of the interference beam that is multiplied by the excitation amplitude distribution.

7. The antenna apparatus according to claim 1, wherein the processing circuitry is further configured to set an excitation amplitude distribution in which a gain in sidelobe direction of the communication beam is reduced, multiply the excitation distribution of the communication beam by the excitation amplitude distribution, and output the excitation distribution of the communication beam that is multiplied by the excitation amplitude distribution.

8. The antenna apparatus according to claim 1, wherein the processing circuitry is further configured to set an excitation amplitude distribution in which a gain in sidelobe direction of the communication beam is increased, multiply the excitation distribution of the communication beam by the excitation amplitude distribution, and output the excitation distribution of the communication beam that is multiplied by the excitation amplitude distribution.

9. The antenna apparatus according to claim 1, wherein the processing circuitry is further configured to set an excitation amplitude distribution in which a gain of the interference beam is increased in a direction corresponding to a sidelobe direction of the communication beam, multiply the excitation distribution of the interference beam by the excitation amplitude distribution, and output the excitation distribution of the interference beam that is multiplied by the excitation amplitude distribution, and to set an excitation amplitude distribution in which a gain in sidelobe direction of the communication beam is reduced, multiply the excitation distribution of the communication beam by the excitation amplitude distribution, and output the excitation distribution of the communication beam that is multiplied by the excitation amplitude distribution.

10. The antenna apparatus according to claim 1, wherein processing circuitry is further configured to calculate an excitation distribution of the communication beam by multiplying the communication signal by a sum-pattern excitation phase distribution for the array antenna as the excitation phase distribution that directs a main lobe of the communication beam toward a communication direction, and to calculate an excitation distribution of the interference beam by multiplying the interference signal by a difference-pattern excitation phase distribution for the array antenna as the excitation phase distribution that forms a null in an antenna pattern in the communication direction.

11. The antenna apparatus according to claim 1, wherein the processing circuitry is further configured to generate the interference signal by shifting a phase of the generated communication signal by 90 degrees or −90 degrees, to set a sum-pattern excitation phase distribution for the array antenna as the excitation phase distribution that directs a main lobe of the communication beam toward the communication direction, set an excitation amplitude distribution of the communication beam, and calculate an excitation distribution of the communication beam by multiplying the communication signal by the sum-pattern excitation phase distribution and the excitation amplitude distribution of the communication beam, to set a difference-pattern excitation phase distribution for the array antenna as the excitation phase distribution that forms a null in an antenna pattern in the communication direction, set an excitation amplitude distribution of the interference beam, and calculate an excitation distribution of the interference beam by multiplying the interference signal by the difference-pattern excitation phase distribution and the excitation amplitude distribution of the interference beam, and the set excitation amplitude distribution of the communication beam and the set excitation amplitude distribution of the interference beam are identical excitation amplitude distributions.

12. The antenna apparatus according to claim 11, wherein the set excitation amplitude distribution of the communication beam and the set excitation amplitude distribution of the interference beam are identical excitation amplitude distributions, and the excitation amplitude distribution of the communication beam is an excitation amplitude distribution in which, of the plurality of element antennas, element antennas at edges have a smaller excitation amplitude of the communication beam than an element antenna other than the element antennas at edges.

13. The antenna apparatus according to claim 11, wherein the set excitation amplitude distribution of the communication beam and the set excitation amplitude distribution of the interference beam are identical excitation amplitude distributions, and the excitation amplitude distribution of the communication beam is an excitation amplitude distribution in which, of the plurality of element antennas, element antennas at edges have a larger excitation amplitude of the communication beam than an element antenna other than the element antennas at edges.

14. The antenna apparatus according to claim 11, wherein the processing circuitry is further configured to generate the interference signal by shifting the phase of the communication signal by 90 degrees or −90 degrees such that a first phase difference and a third phase difference are of different signs and a second phase difference and a fourth phase difference are of different signs, the first phase difference being a phase difference between the communication signal and the interference signal for when the phase of the communication signal is present in a first quadrant, the second phase difference being a phase difference between the communication signal and the interference signal for when the phase of the communication signal is present in a second quadrant, the third phase difference being a phase difference between the communication signal and the interference signal for when the phase of the communication signal is present in a third quadrant, and the fourth phase difference being a phase difference between the communication signal and the interference signal for when the phase of the communication signal is present in a fourth quadrant upon generating the interference signal.

15. The antenna apparatus according to claim 1, wherein the array antenna is a linear array antenna, a planar array antenna, or a conformal array antenna.

16. An antenna excitation method comprising:

generating a communication signal that is a signal to be communicated;

generating an interference signal serving as a disturbing wave for the communication signal;

calculating an excitation distribution of a communication beam by using an excitation phase distribution that directs a main lobe of the communication beam toward a communication direction, the communication beam being a radio wave that transmits the communication signal;

calculating an excitation distribution of an interference beam by using an excitation phase distribution that forms a null in an antenna pattern in the communication direction, the interference beam being a radio wave that transmits the interference signal;

combining the calculated excitation distribution of the communication beam and the calculated excitation distribution of the interference beam; and controlling amplitudes and phases of carrier signals to be provided to a plurality of element antennas included in an array antenna, in accordance with the combined excitation distribution.

* * * * *